(12) United States Patent  
Thramann et al.

(10) Patent No.: US 11,972,461 B2
(45) Date of Patent: Apr. 30, 2024

(54) APPARATUS, SYSTEM, AND METHOD FOR DIGITAL AUDIO SERVICES

(71) Applicant: Auddia Inc., Boulder, CO (US)

(72) Inventors: Jeffrey Thramann, Boulder, CO (US); Michael Perkins, Boulder, CO (US); Jeff Osborn, Boulder, CO (US); Patrick French, Boulder, CO (US)

(73) Assignee: AUDDIA INC., Boulder, CO (US)

( * ) Notice: Subject to any disclaimer, the term of this patent is extended or adjusted under 35 U.S.C. 154(b) by 336 days.

(21) Appl. No.: 16/219,675

(22) Filed: Dec. 13, 2018

(65) Prior Publication Data

US 2019/0188759 A1 Jun. 20, 2019

Related U.S. Application Data

(60) Division of application No. 15/258,796, filed on Sep. 7, 2016, now abandoned, which is a continuation of application No. 13/660,733, filed on Oct. 25, 2012, now abandoned.

(60) Provisional application No. 61/670,491, filed on Jul. 11, 2012, provisional application No. 61/551,307, filed on Oct. 25, 2011.

(51) Int. Cl.
| | |
|---|---|
| *G06F 16/43* | (2019.01) |
| *G06F 16/438* | (2019.01) |
| *G06F 16/638* | (2019.01) |
| *G06Q 30/00* | (2023.01) |
| *G06Q 30/0241* | (2023.01) |
| *H04L 43/106* | (2022.01) |
| *H04L 65/60* | (2022.01) |
| *H04N 21/439* | (2011.01) |
| *H04N 21/81* | (2011.01) |
| *H04N 21/8358* | (2011.01) |
| *H04N 21/858* | (2011.01) |
| *H04L 67/02* | (2022.01) |

(52) U.S. Cl.
CPC ..... *G06Q 30/0277* (2013.01); *G06F 16/4387* (2019.01); *G06F 16/639* (2019.01); *G06Q 30/00* (2013.01); *H04L 43/106* (2013.01); *H04L 65/60* (2013.01); *H04N 21/4394* (2013.01); *H04N 21/812* (2013.01); *H04N 21/8358* (2013.01); *H04N 21/858* (2013.01); *H04L 67/02* (2013.01)

(58) Field of Classification Search
CPC .............................. G06F 16/638; G06F 16/29
See application file for complete search history.

(56) References Cited

U.S. PATENT DOCUMENTS

| | | | |
|---|---|---|---|
| 5,809,085 A | 9/1998 | Goodson et al. | |
| 8,825,518 B2 * | 9/2014 | Levy ...................... | G06F 21/36 |
| | | | 705/14.23 |

(Continued)

*Primary Examiner* — Etienne P Leroux
*Assistant Examiner* — Cindy Nguyen
(74) *Attorney, Agent, or Firm* — Husch Blackwell LLP

(57) ABSTRACT

A system and method for providing digital audio services is described. One embodiment is a method for proving digital audio services, comprising receiving, using a communications interface, an audio stream from a content provider; determining a timestamp for a first audio stream segment; determining a timestamp for a second audio stream segment; updating playlist with a representation of the audio stream; receiving query for content information; and sending offer information, in response to receiving the query for content information.

20 Claims, 14 Drawing Sheets

(56) References Cited

U.S. PATENT DOCUMENTS

| | | | |
|---|---|---|---|
| 2002/0183059 A1* | 12/2002 | Noreen | H04H 60/33 455/414.1 |
| 2005/0053020 A1 | 3/2005 | Thirumoorthy | |
| 2006/0155399 A1 | 7/2006 | Ward | |
| 2007/0022867 A1 | 2/2007 | Yamashita | |
| 2007/0124756 A1* | 5/2007 | Covell | H04N 5/445 725/18 |
| 2008/0082510 A1* | 4/2008 | Wang | H04H 60/40 |
| 2008/0294548 A1 | 11/2008 | Fowler et al. | |
| 2010/0113062 A1* | 5/2010 | Lee | G01S 5/0045 455/456.1 |
| 2010/0134278 A1 | 6/2010 | Srinivasan et al. | |
| 2010/0142715 A1* | 6/2010 | Goldstein | G11B 20/10527 381/56 |
| 2010/0205626 A1* | 8/2010 | Miller | H04H 60/58 455/2.01 |
| 2010/0291907 A1* | 11/2010 | MacNaughtan | H04L 67/53 463/41 |
| 2011/0138020 A1 | 6/2011 | Pantos et al. | |
| 2011/0173208 A1 | 7/2011 | Vogel | |
| 2012/0010996 A1 | 1/2012 | Horvitz et al. | |
| 2012/0023131 A1 | 1/2012 | Downey | |
| 2012/0036034 A1 | 2/2012 | Golden et al. | |
| 2012/0245995 A1 | 9/2012 | Chawla | |
| 2013/0052939 A1* | 2/2013 | Anniballi | H04H 60/44 455/3.01 |
| 2013/0151241 A1 | 6/2013 | Park et al. | |

* cited by examiner

APPARATUS, SYSTEM, AND METHOD FOR DIGITAL AUDIO SERVICES

PRIORITY CLAIM

This application is a division of U.S. patent application Ser. No. 15/258,796, filed Sep. 7, 2016, which is a continuation of U.S. patent application Ser. No. 13/660,733, filed Oct. 25, 2012, which claims the benefit of commonly-owned and assigned U.S. Provisional Application No. 61/551,307, filed Oct. 25, 2011, entitled Apparatus, System, and Method for Digital Audio Services and U.S. Provisional Application No. 61/670,491, filed Jul. 11, 2012, entitled Apparatus, System, and Method for Digital Audio Services, which applications are incorporated herein by reference.

FIELD OF THE INVENTION

The present invention relates to portable devices and systems for providing audio services, including tagging content, purchasing content, and accepting offer content. The field of the invention includes the design and operation of systems and devices for tagging and managing audio content.

BACKGROUND OF THE INVENTION

Current portable interactive devices can be used to tag songs for later purchase. However, these devices use fingerprinting technology that can identify a limited amount of audible content, for example published songs. Furthermore, the user, upon hearing the content they wish to tag, must start an application and then tag the song, in hopes that the song will still be playing when the user is able to tag it. The user then must visit an online music store to purchase the song. Current systems which employ content tagging provide a tagging service for which the consumer must then use another system for purchasing the tagged content.

Some devices have streamlined the process somewhat by automatically obtaining the radio frequency of a broadcaster so that RDS data identifying songs can be captured. Those devices employ a radio feedback loop or "sweeping" to obtain the radio frequency that the device originally receiving the broadcast is set to. However, those devices require a second radio transceiver, in addition to the device originally receiving the broadcast. Some inaccuracies can result, for example, when more than one broadcaster broadcasts the same or highly similar content.

What is needed is a device and system that employs communications protocols that allow a user to seamlessly communicate with broadcasters and content providers and a system in which the device is used and in which the user interacts with content providers and advertisers to purchase content, accept offers, and otherwise interact with content providers and advertisers.

SUMMARY OF THE INVENTION

One illustrative embodiment is a method for providing digital audio services is described. One embodiment is a method for proving digital audio services, comprising receiving, using a communications interface, an audio stream from a content provider; determining a timestamp for a first audio stream segment; determining a timestamp for a second audio stream segment; updating playlist with a representation of the audio stream; receiving query for content information; and sending offer information, in response to receiving the query for content information.

Another illustrative embodiment of a portable device for digital audio services is a portable device for seamless interactivity that comprises a transceiver to communicate with other devices over short-distance, radio-wave communications protocols like Bluetooth and takes advantage of embedded digital information like RDS or RDBS for obtaining content information. Herein, RDS (radio data system), RBDS (radio broadcast data system), embedded content, embedded signal, signal, and the like may be used interchangeably to refer generally to non-audible content that is broadcast with other audible content and that contains information that can be related to such audible content or other information. The advantages of using a communications protocol that can carry digital information include the ability to obtain with certainty a unique identifier of content and then tag that content. The advantages also include the ability to identify the broadcaster which becomes important on many fronts. Broadcasters can interact with their audience and obtain better data on who is listening while also obtaining data about who is responding to interactive advertisements. This data can be used to sell more effective ads to clients who will carry higher pricing for the broadcasters.

Another illustrative embodiment of a portable device for digital audio services is a portable device for seamless interactivity that comprises a GPS device and an audio fingerprinting component for obtaining content information. The advantages of using a GPS-enabled device and fingerprinting include the ability to obtain a unique identifier of content and tag the content in the absence of embedded content information or a second broadcast receiver.

Another illustrative embodiment of a system in which a device, similar to a device described above, is used can include another broadcasting device, such as a TV, radio, car radio, internet radio, satellite radio, stereo receiver, computer, or some other device that can receive broadcast content, audio over IP, or some other audio reception technique, or other device that receives radio or satellite broadcasts. Such device, which does not already exist, could include a transceiver to send and receive content and tagging information, including broadcaster identification. Existing broadcast devices can be modified or upgraded to include such a transceiver in addition to or in place of the existing transmitter of content information. Broadcaster identification is a key component of embodiments of the invention to effectuate tagging.

The present invention can provide a system for digital audio services including the tagging of content, accepting of offer content, purchasing content, and maintaining data associated with content, users, and content providers, including broadcaster identification and information. Exemplary embodiments are described below.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, wherein:

DETAILED DESCRIPTION

Figure 1:
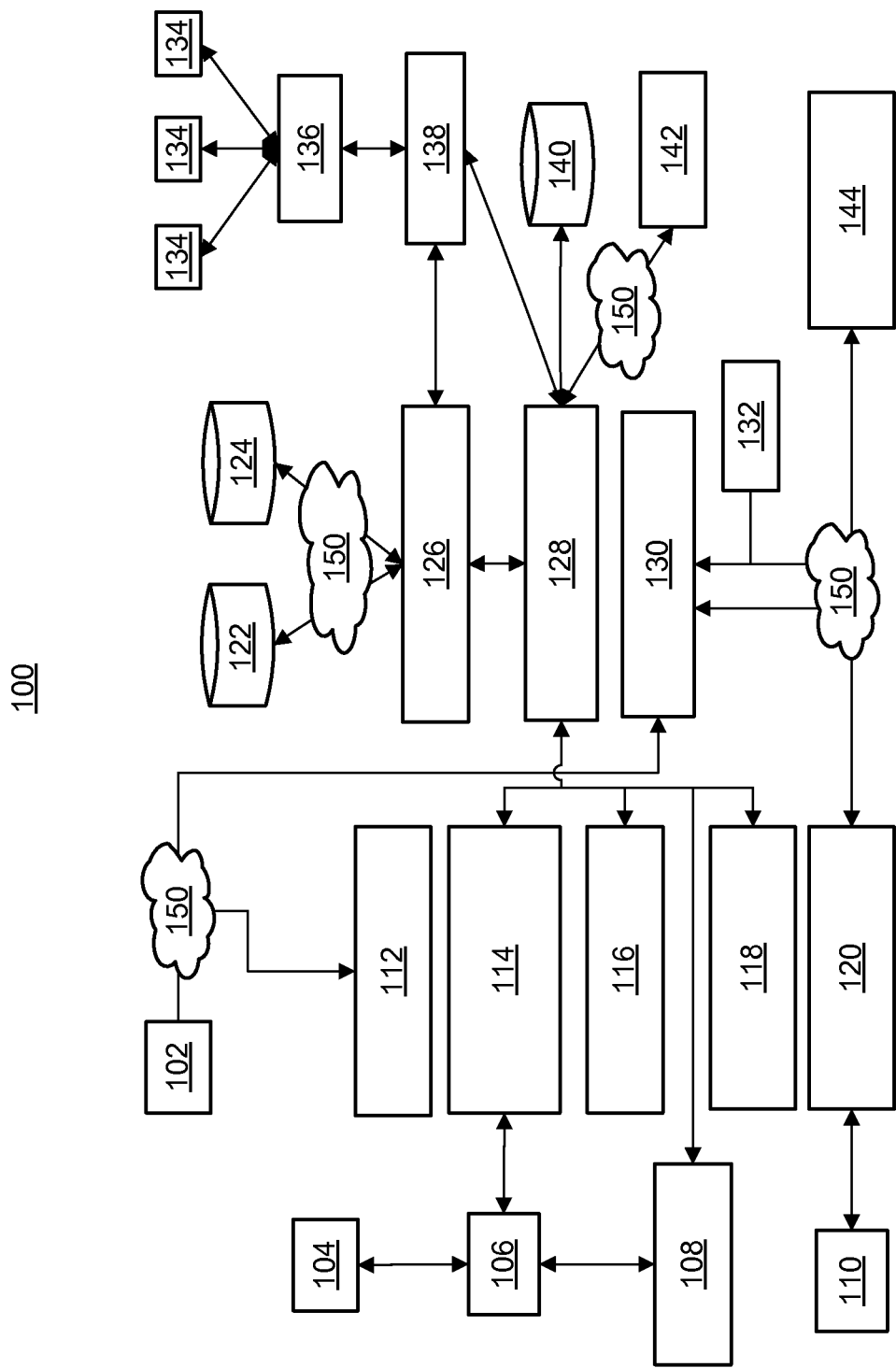
FIG. 1 is a block diagram of a system in accordance with the invention.

FIG. 1 illustrates one embodiment of a system 100 that uses the portable device. This embodiment and others can be known as a Radio Interactive Advertising System ("RIAS"). The embodiment shown in FIG. 1 illustrates some high-level components and modules of a commercial RIAS. Following the FIG. 1 is a narrative describing the purpose and high level functioning of these components and modules. These components and modules are further broken down and described later.

Figure 2:
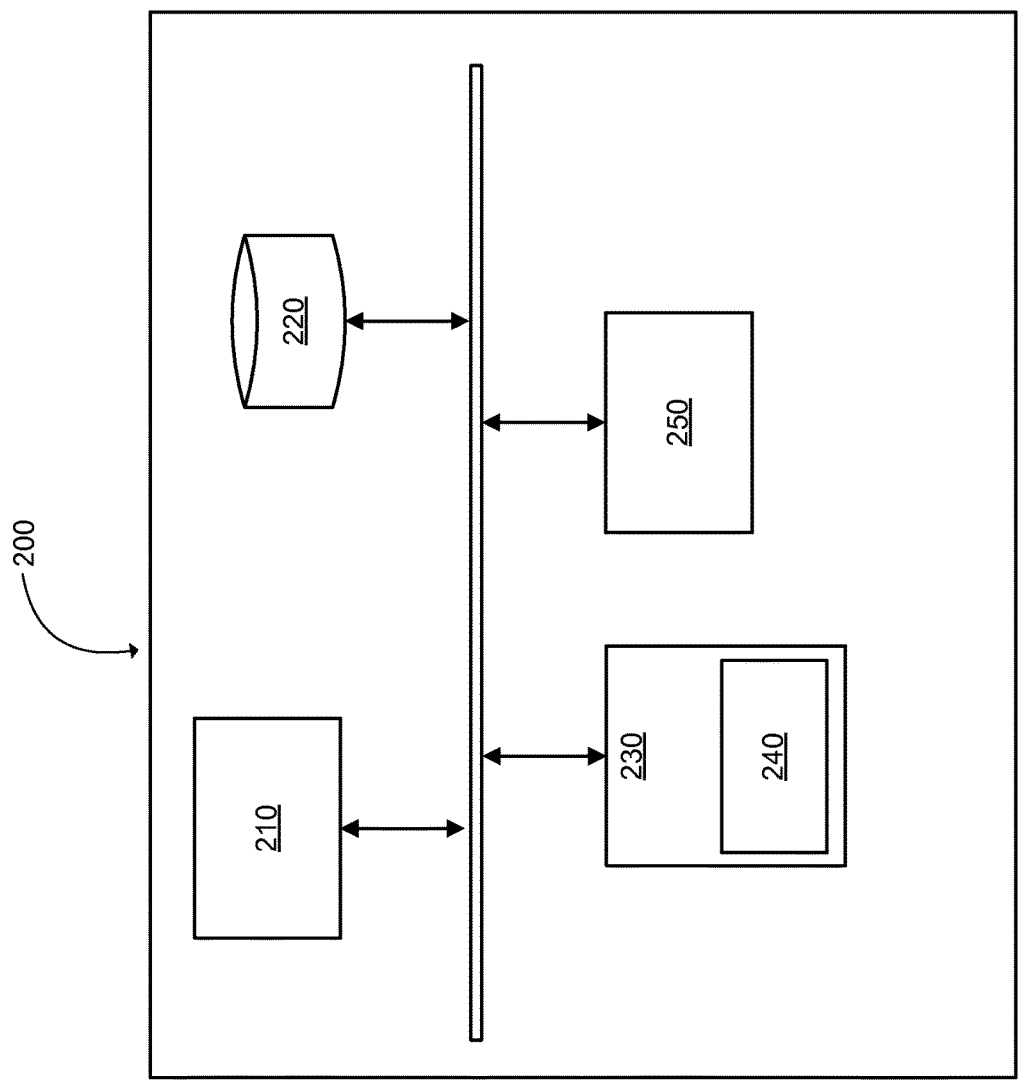
FIG. 2 is a block diagram of a digital audio services server in accordance with an illustrative embodiment of the invention.

Each of the components and modules of FIG. 1 as well as other components of the system described herein can be implemented in hardware or a combination of hardware and software or firmware. For example, each of the data mining tool 116, fulfillment services 118, vendor redemption tool 120, playlist generator 126, offer ID server 128, web server 130, account management 132, station ID server 138, A/D hardware 136, and offer entry tool 108 can be so implemented. FIG. 2 illustrates an embodiment of specially-programmed computer 200 that can implement one or more of the foregoing components. Such a computer 200 can include a network communications interface 210, storage medium 220, memory 230, program instructions 240, and processor 250. Program instructions 240 can be used to implement one or more of the components or portions of components of the system 100. Moreover, in some embodiments, additional hardware components of computer 200 can be included that implement one or more of the components or portions of components of the system 100. The storage medium 220 is can be a hard disk drive, but this is certainly not required, and one of ordinary skill in the art will recognize that other storage media may be utilized without departing from the scope of the present invention. In addition, one of ordinary skill in the art will recognize that the storage medium 220. which is depicted for convenience as a single storage device, may be realized by multiple (e.g., distributed) storage devices.

Returning to FIG. 1, each of the components and modules described herein can be implemented in custom hardware or as program instructions in computer memory that are executed by a processor, the program instructions being stored in a storage medium such as a hard disk drive, flash memory, or optical disc. Each of the components and modules of FIG. 1 can be organized into modules that are further integrated or modularized.

The system 100 can provide the end-consumer with an interactive radio ad experience, allowing a user to interact with the ad (e.g., get more information or purchase an item) using their Smartphone. Using the user app 144 on a Smartphone or other portable device, the user can, for example, 1) purchase the product, 2) get discount coupons for the product, 3) participate in a radio survey, 4) get more information on the product, or interact with broadcasters, advertisers, music publishers or other content providers. For example, an additional benefit to the user is the ability to buy the song currently playing on the radio or other broadcast device. The system can also be used to buy and download other apps. For example, the user can tag an advertisement or other content or click a "Buy" button and an app related to or promoted by the advertisement or other content can be downloaded to the portable device from system 100, the content provider, content retailer, or some other content source.

Advertisers 104 are customers of the system 100, whether the customer is a business directly, an advertising agency, a radio station, or other content provider. In the end, a vendor 110 pays a premium for an interactive advertisement no matter which channel it comes through. The benefits to the vendor 110 include 1) direct feedback on the response to their advertisement on the radio station at that time, 2) a list of qualified leads, 3) additional web or foot traffic in their store and/or 4) actual product sales through the system 100.

It is envisioned that radio stations, other types of broadcasters, or other content providers can push the user app 144. One tool to help promote the use of the user app 144 is a voting tool within the user account webpage 114 which allows users to directly respond to instantaneous surveys run by a DJ, broadcaster, or other content provider. In another embodiment, the user app 144 can be downloaded by the user.

Advantages of the system 100 include, among other things, development of closer ties to the content providers' listening audience, ability to secure additional profits from a share of product sales sold through the system 100, ability to sell more innovative and effective advertising concepts to clients, and ability to increase advertising rates from more targeted ad campaigns. For example, the system 100 can create value for the broadcasters and other content providers because the system 100 can be used to identify which customers in a local area recently bought songs from a particular artist. If the artist was coming to town for a concert, the system 100 could provide information to local broadcasters showing how many listeners bought songs from the artist or related artists and at what times the songs were bought. Broadcasters could use this information to charge higher advertising rates to concert promoters for more targeted ads. Alternatively, broadcasters and an operator of the system 100 could sell the tickets through the system 100 and keep a commission. Because customer information is stored in the system 100, the system 100 could also be used itself to push the sale of tickets to the known customer base.

Another advantage of the system 100 is that, because music and other content can already be stored, content can be directed to devices other than the device used to tag the content. The system 100 can include a database of user tagged or purchased content that can then be streamed or otherwise delivered to a user's device. For example, a user can tag content heard over a car radio, the tagging leading to a purchase of the content. The system 100 can store the content or a representation of the content in a database. The system 100 can also provide the tagged content to another device, such as a stereo component configured to communicate with the system 100, a computer, or another portable device, where the device is identified as belonging to the same user. In another embodiment, tagged content can be directed, by the system 100, to the user's car radio. A person of skill in the art readily appreciates that car radios and other broadcast devices may have to be modified to receive such tagged or stored content. Broadcast devices can include wireless communications interfaces that can receive content through radio-based communications, like Bluetooth or cellular communications, IP-based communications, infrared communications, or some other method. Broadcast devices can include wired communications interfaces as well, including Ethernet or other IP-based communications, USB or other IEEE-standard wired communications, or some other wired communications method. In one embodiment, tagged content can be downloaded to the other device when the user purchases the content. In another embodiment, the content can be downloaded to the device temporarily. In yet another embodiment, the content can be streamed to the other device. The advantages of the foregoing embodiments include, among others, the ability of the user to enjoy the content through a higher fidelity or higher quality medium, the ability to potentially receive the content faster because the other device may have more communications bandwidth to receive the content.

Advantages of the system 100 also include innovative advertising/marketing options. For example, use of coupon-like offers like "deal of the day" service where deals could be pushed by broadcasters or other content providers. Deals can be purchased in real time and used immediately. For example, a deal for lunch could be pushed by a content provider, purchased in real or near-real time, and used immediately as the purchaser heads out to lunch.

In operation, an advertiser 104 can create an interactive advertisement by working with the administrator 106. The administrator 106 can enter the interactive advertisement in the system 100 through the offer entry tool 108. The audio of the advertisement can be stored in an ad fingerprint database 122, for example Audible Magic Ad Database, along with a unique offer ID number. A person of skill in the art appreciates that a different database to store media content can be used, including a database managed by a content provider or third party. Additionally, the music database 124 described later can also be described as part of the ad fingerprint database 122. Thus, the ad fingerprint database 122 and music database 124, either individually or together, can be referred to interchangeably. Either database 122, 124 can be internal to the system 100 or a third-party database, such as Audible Magic, Gracenote, or other fingerprint database. The details of the offer can be stored in the offer and user-account database 140 by, for example, a unique offer ID number. As not all ads will be interactive, it is envisioned that a specific interactive advertisement will include an announcement to the end-consumer that this particular ad is interactive and they should stand-by with their user app 144. It is preferable that all ads from participating broadcasters are interactive. In some embodiments, where some ads are not interactive, a user can still select an advertisement (e.g., click on the ad or related URL) and be presented with a web page of the content provider (e.g., advertiser or broadcaster).

When an app-user uses the user app 144, a snippet of audio can be recorded by the Smartphone or other portable device and transmitted to the offer ID server 128. Audio can be transmitted from a TV, radio, car radio, internet radio, satellite radio, stereo receiver, computer, or some other device that can receive broadcast content, audio over IP, or some other audio reception technique. For example, other audio devices include a sling box, portable stereo, hand-held audio devices such as an iPod, iPhone, or some other smartphone-like device. In another embodiment, the portable device that executes the user app 144 may also be the device that receives and plays the content.

In the embodiment illustrated in FIG. 1, the offer ID server 128 first matches the audio to one of the local radio stations with a query to the station ID server 138. The station ID server 138 is constantly listening to all the radio stations of interest (via the A/D hardware 136) and buffering the last few minutes of audio for each station. The station ID server 138 can identify the radio station being listened to by, for example, comparing the app-user audio to the buffered radio station audio using algorithms described below. The station ID server 138 then returns the radio station ID and potentially a noise-free copy of the audio (for the same time period that the app-user recorded) to the offer ID server 128. The offer ID server 128 then queries the playlist generator 126 for exactly what was playing on the radio station. The playlist generator 126 can return the song being listened to, the interactive ad ID, or other content indicator. The playlist generator 126 can identify a song by querying the music database 124. The playlist generator 126 can identify an ad by querying the ad fingerprint database 122. Assuming the app-user was listening to music, the music catalog number or some other song identifier can be returned to the offer ID server 128 for purchase by—and distribution to—the app-user. Assuming the app-user was listening to an ad, the offer ID server 128 can query the offer and user-account database 140 for offer details and information. The appropriate actions are taken based on, for example, the offer details and a chit can be returned to the user app 144 and recorded under the app-user's account in the offer and user-account database 140.

For purchases, the offer ID server 128 interacts with the credit card authorizing agency (e.g., Authorize.net 142) or some other purchasing agent to complete the transaction. Purchasing agents can include entities like PayPal, credit card companies or their agents, banks or their agents, or other entities responsible for authorizing cashless purchases. For purchases where the app-user redeems the offer with the vendor 110, a vendor redemption tool 120 can be used to insure that offer is only redeemed once by each app-user.

A user app 144 for use on a portable device, such as an iPhone, other smartphone (e.g., Android-based phone, Blackberry, etc.), or some other portable user device can be included. In one embodiment, the user app 144 can have three basic modes of operation. First is account set-up. Second is requesting a live radio or other received offer, including voting. In one embodiment, voting can entail the app-user making a selection or taking some action while some content is played. For example, voting can include an app-user clicking on a user interface element while a song is playing. Voting can include purchasing and downloading content broadcast or otherwise transmitted by a broadcast entity or other content provider. Voting is further explained below. Third, a mode can be management of accepted offers. In other embodiments, these modes of operation can be further combined or separated and other modes of operation can be included.

The user app 144 can include real-time voting. As part of that, buttons in the user app 144 can be repurposable so that requirements for voting depending on scenarios described elsewhere herein can be met. Buttons can change when content that can be tagged is played or when the content provider (e.g., radio station) runs a contest or vote. Buttons can be repurposed to accommodate these different scenarios for example, by changing a "Like," "Approve," "Tag" button to a "Buy" button. A person of skill in the art should appreciate that such buttons can be coded graphically, by color, size, or some other characteristic rather than or in combination with text.

In one embodiment, the user app 144 can present the user with multiple different buttons. For example, a content provider can run a campaign for donations in which users select from multiple donation amounts or a content provider can run a campaign in which users select, from multiple options, the most popular content (e.g., most popular artist, song, and the like), content type, or product. Other types of voting can include a campaign for selecting content to be broadcast, selecting content or products, selecting answers or solutions to quizzes or puzzles, and the like. Those of skill in the art can appreciate the different types of voting that the user app 144 can be used for.

The user app 144 can be configured to transfer voting information or feedback to the content provider (e.g., radio station) during the voting. Location information for the device and other user information can be transmitted to the content provider. An advantage of the real-time voting is that no advance scheduling is required. Vote information, including button configuration and preset chit information, can be transmitted to the user app 144 from the offer ID server 128, web server 130, or other server for immediate, real-time voting. Voting then can be conducted within a local market. For example, a local radio station can originate voting information for a campaign for transmittal to user devices via a server within the system 100.

It is envisioned that a password-protected account management 132 website will be set-up for system 100 where users can enter e-mail address, shipping address, credit card info, etc. The website will be available from within the user app 144, an Internet browser, or other user interface.

Figure 3:
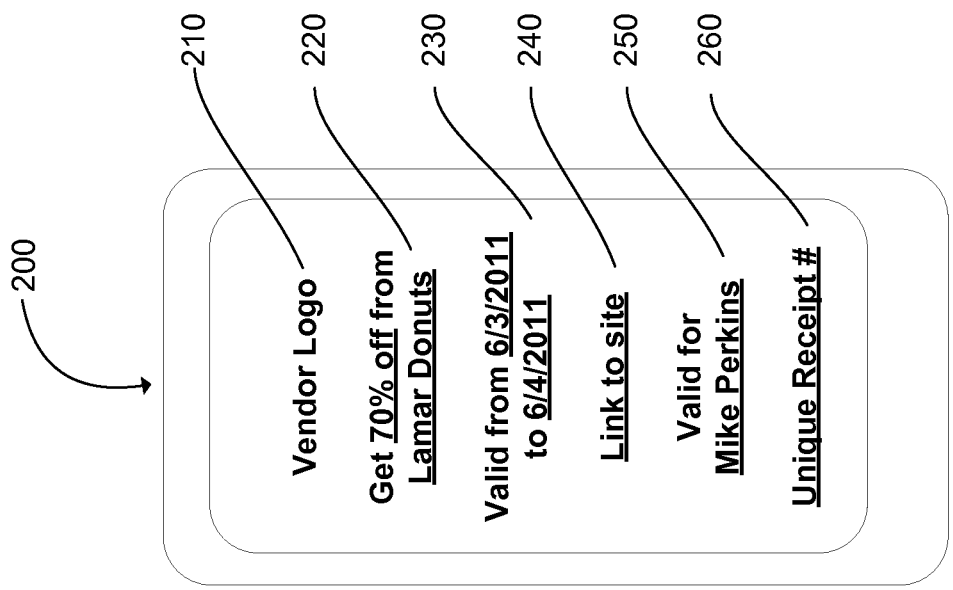
FIG. 3 is an illustration of a portable user device displaying information generated by an embodiment of the system in accordance with the invention.

In some embodiments, every time the app-user requests a radio offer, they receive back a chit. A chit is effectively an electronic coupon/receipt and contains all the pertinent information about the offer. FIG. 3 illustrates an exemplary embodiment of usage of a chit.

Referring to FIG. 3, an exemplary embodiment of chit usage is illustrated. The user app can receive a chit for an offer. The chit can be received on the device 300 running the user app 144 and in the offer and user-account database 140. The chit can contain information about the vendor 110, such as its logo 210, deal information 220, timeframe 230, etc. The app user 144 can allow for click-through ads 240 which, when the user clicks, the user app 144 can load a vendor 110 website. If the offer is specific to a user, the chit can include user information 250 and individual user ID information can be sent to the vendor 110. A receipt number 260 unique to the user can also be included in the chit. The user app 144 can also allow for a user to view one or more chits at a time. Additional high-level functions and components of a user app 144 follows:

A. Registration for first time app-user including: e-mail, phone number and/or phone identifying number, credit card, shipping info and password
B. Allow changing of account settings
C. Chit manager
 a. Stores chits in folder
 b. User can flip through chits
 c. User can delete a chit
 d. User can delete all chits
 e. User can not archive old chits
 f. Chit may have active hyperlink in it, which needs to work. It should pull-up the browser to open the link. Note the hyperlink will always point to a Cardinal Peak redirect site so that traffic can be monitored. This redirection and tracking capability is built under Milestone 3.
 g. Chits have an expiration date and are automatically deleted
D. Offer button (when pushed)
 a. Record audio
 b. May turn audio into spectrogram
 c. Registers with the web-server without user interaction
 d. Sends audio to server
 e. Receives back station ID & chit
 f. Create redemption code (can be unique to content, content provider, content source, user, etc.)
E. Voting functionality of offer button (multi click)

A chit management application can be included to search for and otherwise manage chits. A chit management application can include a user interface and can provide field searching or keyword searching, manual updating of information stored with a chit, such as user information or preferences, chit deletion, and the like. The management application can also include links for a user to share chits or chit-related information through social networking. A management application can also be used to transfer chits from one device to another device. Such transfer methods can be accomplished via Bluetooth or some other wireless protocol or via some wired protocol (e.g., USB connectivity). As described elsewhere herein, chits can be stored in the cloud or on a proprietary server (i.e., a storage mechanism operated within the system 100). Transfer of chits can be accomplished from one server to another via the cloud or the server on which chit information is maintained.

Embodiments of the user app 144 is currently envisioned as having the following screens:

A splash screen at start-up
A first time use screen that encourages the app-user to set-up an account
The home screen which consists of a giant button to accept an offer or purchase music, and four tabs at the bottom for access to 1) settings, 2) chit manager, 3) tagged music and 3) home screen
The chit manager screen. This screen will have a listing of all chits. Each item in the list includes vendor, offer, radio station, expiration date. The app-user can click on any chit in the list to bring up the full size chit.
Detail chit screen shows a chit in detail. The app-user can page forward/backwards to the other chits. The detail chit is assumed to be a graphic image with up to six clickable links.

Similar to the chit manager screen is the tagged music screen. There is one page that has a list of tagged songs. The app-user can click on any song in the list to bring up the detail music page.

The detailed music page is populated with album art, album name, artist name, tagged date and station it was tagged from. A link is provided to buy the song. The app-user can page forward/backwards to other detailed music pages.

Returning to FIG. 1, the station ID server 138 can be configured to include the following functions and characteristics:

Has input for radio stations

Can operate without RDS/RDBS/PDS

Has input fields (or configuration file) to identify an analog input to a specific radio station Continuously sends out digitized audio signals for each station to the Playlist ID server (or process) via UDP Computes real-time spectrogram for each station continuously (maintained in memory)

Receives query from offer ID server 128 (contains audio clip from cell phone)

Computes spectrograph of user audio clip

Matches user spectrograph to radio station spectrograph

Returns radio station value to offer ID server 128

The embodiment shown in FIG. 1 can include scalable hardware. For example, it is highly desirable to have a multi-channel Ethernet-capable A/D with good resolution. Appropriate supporting system calls can be written as part of the station ID server 138 task.

Still referring to FIG. 1, the playlist generator 126 can build and maintain a playlist in a number of ways. First, it can constantly query the ad fingerprint database 122 and the music database 124 (using the audio coming in from the A/D hardware 136) to determine what is playing on each station (independent of the app-user using the user app 144). Second, it can query when a request from a user app 144 comes in. The former methodology creates continuous playlists which may have some value in themselves and it can have a fixed number of actions in a given day which it not affected by app requests. The latter methodology does not yield a playlist, but does reduce the number of times that the databases are queried which may reduce costs for the music data during periods of low activity. In another embodiment, samples of content can be sent to a database, such as Audible Magic, or other fingerprinting database which can then return information about the content. The returned content can then be used to reconstruct a playlist. Such a method can be used by a system that captures broadcasts from each station or select stations whose broadcasts can be received, for example broadcasts within a geographic area. For each broadcast or select broadcasts, the content, content samples, or representations of content can be sent to the database to obtain content information. In this way, playlists for each broadcast or select broadcasts can be constructed.

In some embodiments, content sampling can be used to construct a playlist. Samples can be taken at pre-determined intervals in order to ensure all content is captured. For example, samples can be taken at intervals of 5 seconds and sent to the music database 124 or identification. It is unlikely that any distinct content (e.g., each song or advertisement) will be less than 5 seconds; therefore, it is highly likely that all content is properly sampled. Other intervals can be used. For shorter intervals, the cost can rise for use of a third-party music database 124 to obtain playlist information. For longer intervals, the cost drops; however, the likely accuracy of the playlist also drops.

In one embodiment, RDS, RDBS, or some other signal in the broadcast can be used to trigger a sampling. The length of a song can be received from the signal to then determine the length of the sample. When a new song starts during the broadcast, the signal which includes the new song's information can trigger the sample. The song can then be sampled for a predetermined length of time. Then, rather than sample again at some arbitrary, predetermined sample rate, a wait time can be calculated from the length of the sample and the song length. For example, if the sample length is 30 seconds and the song length, which would be received from the signal, is three minutes, the wait time before sending a sample to the music database 124 could be set to two and half minutes. The interval to the next sample could also be set to two and a half minutes. After the two and a half minutes, a new song would be played and, consequently, new content information from the signal could be received. Another sample could be then be taken and sent to the music database 124 for identification.

For other content which may not include length data in the signal (e.g., advertisements), samples could be taken at a predetermined interval. For example, for advertisements, a sampling interval could be set to 15 seconds. When content which is accompanied by length data in the signal is then broadcast again, a variable sampling interval could be used again. In some embodiments, other content could be watermarked, described herein, to embed information about the content. The broadcaster, vendor 110 of an advertisement, or other content provider could watermark the signal. The watermark can include information similar to that found in RDS or RBDS signals or other information. For example, information related to an offer specific to the advertisement, information about the vendor 110, and the like.

In one embodiment, the time remaining in audio content can be determined using the signal data and matching a sample to the audio content in the ad fingerprint database 122 or music database 124. When the fingerprinting technology matches a sample against the content, it can determine the time during the audio content when that sample starts. The signal also contains the length of the audio content. The remaining time in the audio content playback can be determined by subtracting the start time of the sample and the length of the sample from the length of the audio content.

The same logic can be applied where the sample is repeated multiple times in the audio content. It can be useful to find the last instance of the sample in the audio content and find the remaining time from that instance. For example, the fingerprinting technology can determine that the sample starts at 35 seconds into the song. Where the audio sample is repeated during the song, the fingerprinting technology can also determine the starting point of the last segment of audio content that matches the sample and, from that, determine the time remaining in the audio content. For example, if an audio sample is repeated three times in a song, at 35 seconds, at one minute and 70 seconds, and at two minutes and 40 seconds, where the song lasts three minutes and 30 seconds and the sample is ten seconds long, the fingerprinting technology can match the sample to the last repetition of the audio sample and determine that there are 40 seconds remaining in the song by the end of that audio sample or that there are 50 seconds remaining after the start of the sample. In such embodiments, the interval until the next sample is taken can be set to the remaining time or slightly greater because it is known that the start of the next song or content is at least that amount of time.

In another embodiment, the time remaining in audio content can be determined from two different samples. Where a first sample is taken and a second sample is taken after a predetermined interval, the fingerprinting technology can use the known time of the start of the first sample and the predetermined interval to then determine the start of the second sample. Then, the remaining time of the audio content can be determined from the length of the audio content and the start time of the second sample. A match of the second sample can be used to determine whether the second sample is part of the same audio content as the first sample when it is not known at the time when the second sample is taken whether it is the same audio content. The determination that the second sample is part of the same audio content can be used as input to the determination of the remaining time in the audio content broadcast.

In another embodiment, the system can ensure that a sample is taken from a predetermined first part of audio content. For example, an RDS signal can trigger a sampling at the beginning of a song for a 30 second sample. Then, the fingerprinting technology can limit the search for content information to the first 30 seconds of audio content, rather than the entire length. Other predetermined segment limitations of audio content can be set to gain efficiencies in fingerprint matching. Both the start time of the sample and the length of the sample can be predetermined. Those of skill in the art can appreciate that other predetermined sampling start times, predetermine sample lengths, or both can be used.

In one embodiment, a timestamp from when the user tags content can be used to identify content by comparing it against the playlist, for example as created from step C below. This can be useful, for example, when content overlaps (e.g., song 1 ends after song 2 starts). Step F, described below, can be used to disambiguate the tagging. It would be known, when content overlaps, that a tag timestamp that occurred before the first content ended and after the second content started would require disambiguation. In that case, the relative times of the timestamp, content end, and content begin could be used to determine which content was tagged. In one embodiment, the user may disambiguate the tagging. In such a case, the user can be presented with a list of the potential content that the user may have tagged for the user to then select which content the user intended to tag.

Figure 4:
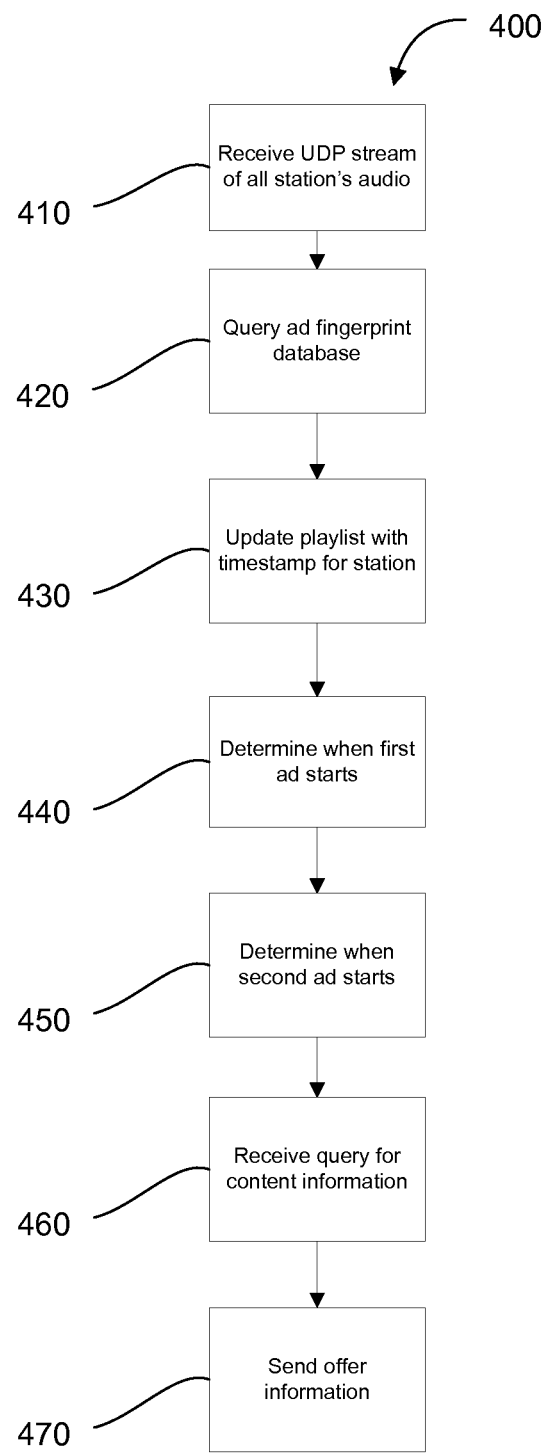
FIG. 4 is a flowchart of a method for processing audio stream content and providing services information in accordance with an illustrative embodiment of the invention.

Referring now to FIG. 4 a method for determining content and delivering content information 400 is displayed. A radio station's audio is received 410. The station ID server 138 can include an input to receive that audio either via the broadcast signal or some other mode. For example, a UDP stream of the audio can be received via the A/D Hardware 136. Audio can be received via other methods as well, including capturing an audible broadcast stream. A/D Hardware 136 or some other component of system 100 can include a communications interface which receives the audio stream. It should be understood that a communications interface can be any type of interface for receiving the audio stream and can include hardware and or software. Different types of communications Also, audio or spectrographs of the audio can be received. If audio, then the playlist generator 126 can have the capability to create spectrographs. The ad fingerprint database 122 is queried 420. This query can be performed by the playlist generator 126. The ad fingerprint database 122 can include the audio of the content, which can be in spectrograph form or some other form. Based on the results of the query 420, the playlist can be updated 430 with information from the query about the content. As explained herein, the query can be repeated at regular intervals or based on recognized content. A playlist with timestamp for the station being listened to can be updated 430. A playlist can include representations of the audio content received. Representations can include spectrographs, other types of fingerprints or signatures, RDS-type information, and the like. Such audio content can include music, advertisements, or other broadcast content (e.g., audio from radio host). When a first ad starts can be determined 440 and when a second ad starts can be determined 450 based on the information from the query. This step can be applied to other types of audio content segments (e.g., songs, radio host audio, etc.). Furthermore, ads can be third-party produced advertisements, advertisements recorded by a radio host, or promotions or advertisements broadcast live. A query for information about the content can be received 460. The query can be for information about an ad and can include a timestamp that can be used in finding which ad information is desired based on the determinations 440, 450. The query can be to the playlist updated at step 430. As a result of processing the query, offer information can be sent 470. Such offer information can be related to the ad information desired, offer information indirectly related. For example, a query can be received for ad information for one ad and offer information for vendors other than the ad vendor or offer information from the same vendor but for a different product or service can be returned.

In a preferred embodiment, audio content is sampled in preparation for creating a spectrograph or other processing. Use of a 24 KHz audio rate for this sampling is desirable. Therefore, as part of the sampling, conversion from one rate to another can be used. For example, CD-quality audio occurs at 44.1 KHz. In this case, down-sampling from 44.1 KHz to 24 KHz would be used. The sampling would occur between two samples at the higher rate of 44.1 KHz (see below, "x" and "0" indicate sample times):

| x | x | x | x | x | 44.1 KHz | 0 | 0 | 0 | 24 KHz |

The sample from the 44.1 KHz signal that immediately follows the ideal location can be used. This requires no interpolation, but a simple look up table can be used to map sample offsets in the larger sample rate to the smaller. The table can be queried to find which portions of the audio content at the 24 KHz rate that match the samples from the 44.1 KHz rate. For example, 147 samples from the 44.1 KHz signal can be read and the 80 samples in accordance with the 24 KHz rate of those 147 samples from the 44.1 KHz sample can be used. Those 80 samples would conform to both the 44.1 KHz and 24 KHz data rates. This can be repeated as necessary.

Returning to FIG. 1, the fingerprint database 122 can be similar to the standard music ID database used by services like Audible Magic and Gracenote. However, it can include spectrograms of the interactive ads, music, and other audible content. In the embodiment shown in FIG. 1, this database is managed by the offer entry tool 108 which can be used to load spectrograms, delete spectrograms and produce reports on 1) what is in the database, 2) when they expire and 3) which ads should be deleted now.

The music database 124 can be a commercial database provided by Gracenote, Audible Magic, or similar commercial or other similar service. Further, it can be a private database not operated by an existing database provider. In the embodiment shown in FIG. 1, it contains spectrograms for vast numbers of songs and other media. A clip is sent to this database, and the meta-data for the song is returned (album, artist, album art, lyrics, Amazon catalog number, iTunes catalog number, etc.). Costs and processing times can be reduced if searches are limited to popular music (e.g., 500,000 tracks of the most popular titles) instead of the full 13 million items in the database.

Figure 5:
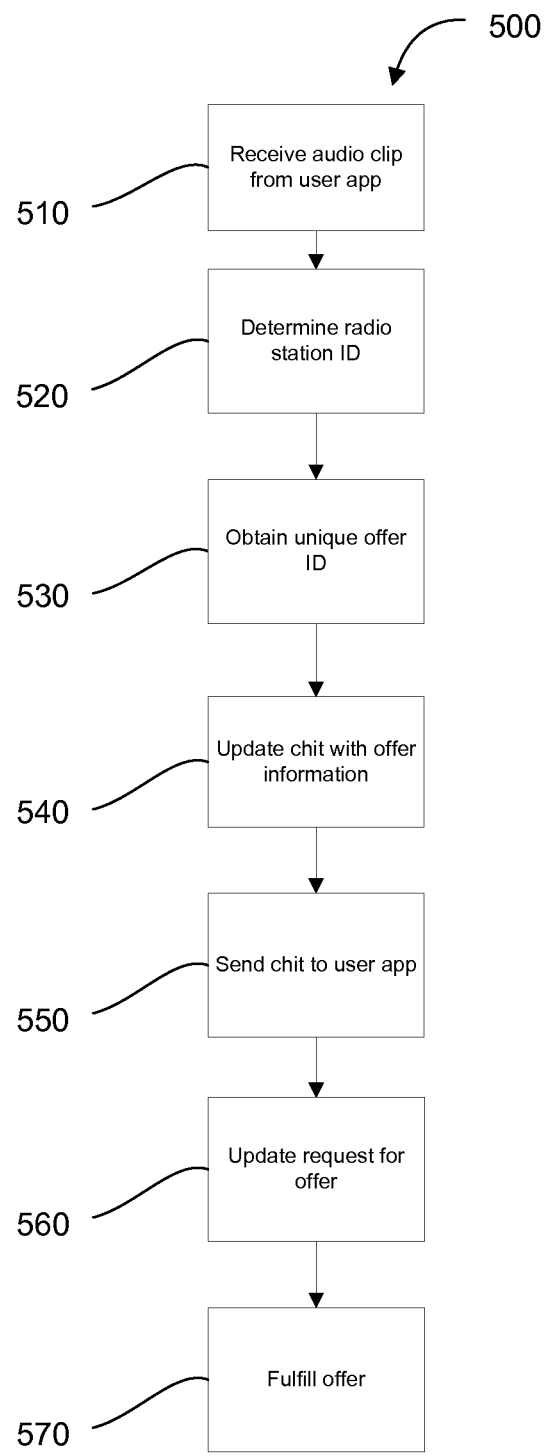
FIG. 5 is a flowchart of a method for processing audio stream content and providing services information in accordance with another illustrative embodiment of the invention.

Referring now to FIG. 5, a method for fulfilling an offer 400 is displayed. The method 500 can be performed by the offer ID server 128 and other components of system 100. Audio clip from user app is received 510. The audio clip can be for an ad or other type of content. Radio station ID is determined 520. The station ID server 138 can be used to determine the radio station ID based on the content or by using information received from the user app 144 and querying a database. A unique offer ID is obtained 530. The offer ID can be obtained by using the radio station ID and timestamp to query a database or to generate one using user information along with the radio station ID, timestamp, content information, or some combination thereof. At step 540, a chit is updated with the offer information for the given offer ID. The chit can be stored in a database such as the offer and user-account database 140. The chit can also be updated with radio station information and other information. The chit is sent back 550 to the user app 144. At step 560, the app-user's request is updated in the users account history in the offer and user-account database 140. At step 570, the offer is fulfilled. As part of this step, if app-user purchased music or other digital media, then the offer ID server 128 can purchase music from an online music store, delivers music to a Smartphone or other portable device, deliver music to the offer and user-account database 144 for the user, copy a receipt to the offer and user-account database 144 for the user, or some combination thereof. If the app-user purchased a coupon-like offer or other non-media item, then the vendor 110 can be notified of the purchase or fulfillment of the offer and purchase information can be provided via the vendor redemption tool 120, a receipt can be copied to the offer and user-account database 144 for the user, or some combination thereof. The fulfillment method 500, and step 570 in particular, can also include support for credit card transactions.

Returning to FIG. 1, system 100 can include a web-server set-up for interaction with the vendor redemption tool 120, user account webpage 114 and the user app 144. The embodiment shown in FIG. 1 includes a offer and user-account database 144 which can be a common database for offer identification and app-user information. This offer and user-account database 144 can contain, among other things, the following information and include interaction with the following modules, among others:

User Account Set-up information
e-mail address
street address
credit card information
cell phone identification number
password
User Locker Information
Receipts for each purchase
Record of each inquiry using the user app 144
Stored music purchases
Copies of all active chits
Status of redemption of coupon-like information
Expiration timing of chits—the system can alert users of a chit that is about to expire or alert users to the amount of time remaining until a chit is about to expire.
Offer Information
All items on chit
All other information entered by offer entry tool 108 for historical and billing records
Chit-related information (location of offer, timing of offer, vendor data, etc.)
Vendor redemption tool 120 supporting information
Vendor 110 information—name, address, points of contact, etc.
Redemption status as collected by vendor 110
Purchasing information, including methods for transferring purchasing information to vendors 110
Radio Station and other content provider voting information
Radio station ID information
Webpage for voting
Whether the content provider participates in voting
Chits to return for voting Chit users can be alerted based on a number of conditions. An alert can be generated to notify a consumer that the consumer is within a predetermined distance from a merchant relevant to the chit. A chit can comprise a coupon or some other offer or advertisement for a particular merchant and if the consumer is within a predetermined distance, the user app 144 can generate an alert on a device of the consumer. Additionally, for a chit that may be relevant to more than one merchant, an alert can be generated for any one or more of the relevant merchants. For example, for a chit that includes a coupon for a free oil change, an alert can be generated when the consumer's device enters a 2 mile radius of the oil change merchant. The distance at which the alert is generating can be set by a user preference, by the merchant, by a system administrator, can vary depending on a number of factors, or can be set based on a combination. Moreover, the predetermined distance can be merchant-specific or chit-specific.

In some embodiments, the distance at which the alert is generated can depend on location, rate of change of the location of the device (i.e., velocity), time, and the like. For example, where the rate of change of location is low, the distance at which an alert is generated can be much smaller than when the rate of change of location is higher. The velocity, or speed at which the device is traveling, can be determined by a GPS function of the device, by using a speedometer in or on the user's vehicle, or some other device or method for determining velocity or speed. Information from a vehicle speedometer or other device could be delivered to the device which hosts the user app 144 by Bluetooth, some other short-distance radio-wave-based protocol, some other wireless protocol, or some other data transfer method, either wired or wireless. In addition to speed information, the device could also receive location information from the vehicle as well. Speed information, location information, and the like can be sent to the device or derived by the device at predetermined intervals. Further, when it is determined that a device is in an urban or densely populated area, the distance at which an alert is generated can be smaller than otherwise. In this way, when it can be fairly determined that the device user is on foot or in a dense downtown area, the alert distance can be shorter to ensure the device user is within short walking distance to a merchant. On the other hand, if it is determined that, even though the user device is within a dense urban area, but the rate of change of location is higher (i.e., it is likely the consumer is driving, on a train, on a bike, etc.). Moreover, the direction in which the device is moving can be used as part of the basis for determining the alert radius. For example, if the user is moving toward a merchant, the alert radius can be widened to ensure that the device consumer has time to decide to visit the merchant. Whereas if the user is moving away from a merchant, the alert radius can be narrowed. As another example, it can be determined that the location of the user device is within a shopping district. In such a case, the distance can be reset one or more times when it is determined that the device crosses radius thresholds.

An alert can be generated at predetermined times also. In some embodiments, an alert can be generated during a merchant's business hours or during some other predetermined period. For example, an alert can be generated based on hours during which the merchant is typically less busy. In other embodiments, chits can be updated by merchants such that the alert time or distance is updated. For example, the merchant can login to the system and update a merchant profile or chit profile. In response, the system can update chits on consumer devices so with the updated information. In other embodiments, a device user can set alert preferences so that alerts are sent according to an original setting, an override setting that the user determines, or to suppress any alerts. Alert preferences can be set universally for all chits, for all chits for a merchant, for chits that meet some other criteria, or for individual chits.

Other embodiments can implement an offer and user-account database 140 that includes other user-based or offer-based information. For example, the app-user will be able to see which coupon-like offers they have redeemed and which they have not. Other embodiments can include a location-based database or service to which chits can be linked to, uploaded to, or otherwise related to so that a user can be alerted that a the user has a chit that is relevant to a vendor 110 in close proximity. Whether an alert is given can be based on, for example, vendor 110 information, the proximity, expiration status, some other chit-related data, vendor-related data, user setting, similar information, or some of combination of the foregoing. For example, for non-franchise vendor 110, proximity of several miles can trigger the alert. In yet another example, for franchise vendors 110 who have many franchises, proximity of a much shorter distance can trigger the alert. In yet another example, an alert can be triggered when a chit is about to expire. In yet another embodiment, chits for certain vendors 110 can trigger an alert. In yet another embodiment, alerts can be triggered if the user opts to allow alerts or for some other user setting. In yet another example, if the user has a chit for a deal, for example, for 50% off an oil change at an oil change franchise, the user can be alerted upon approach to the franchise. Furthermore, the data maintained in the offer and user-account database 140 as shown in FIG. 1 can be maintained in separate database.

In some embodiments, chits can be used to bind multiple pieces of information to enhance the user experience. For example, personal information, products or merchants, content or content information, content provider, redemption code, and the like or combinations thereof can be bound using a chit. Chits can be personalized based on user preferences or user profiles. Such user profile information can include demographic information related to the user, past activity related to the user (e.g., past purchases, past tagging activity, past content interaction, etc.), and the like. Also, such user preferences can include settings for chit setup and display, user-set demographic information, and the like. Demographic information can include information about the user's device (provider, type, etc.), user personal information (name, address, consumer habits, etc.), derived information from the user's past activity, and the like. Chits can also be tied to content other advertisements. Content related to personalities associated with a particular merchant or product can be bound to a chit along with the particular merchant or product. For example, when a song is played by an artist who endorses a particular product, a chit can be created which binds the information about the artist, song, product, or information related to the content or the particular merchant or product. If a chit is pertinent to the personality or content, the chit can be updated with information related to the new content, product, merchant, or personality. As another example, a chit can bind location information of a device, information related to a deal or offer, and a redemption code (which can be unique to the user, device, offer, etc.). Therefore, the chit can be optimized or customized based on those particular data. A person of skill in the art should appreciate that many combinations of the above types of information can be bound in different combinations with the different types of information and/or combinations can be updated to enhance user experience.

Chits can include information sufficient to allow a user to make a purchase. Such a purchase can of content downloadable to a device or of some other product. Information sufficient to allow a user to make a purchase can include credit card or other financial information (e.g., bank account information) and information related to the content. For other products, such information can include shipping information for the user (e.g., address, shipping type, other preferences and the like), merchant information, product information, and the like.

Still referring to FIG. 1, the offer entry tool 108 of system 100 is used by an administrator 106 to enter new interactive offers, add new offers, modify existing offers, delete expired offers, archive old offers and otherwise manages the system. The data from the offer entry tool 108 is stored in the fingerprint database 124 or advertisement database 122 and in the offer and user-account database 140. It should be understood that each of the databases 122, 124, 140 can be further separated or combined. Also, in other embodiments, the offer entry tool 108 may be combined with other modules or the functionality of the offer entry tool 108, can be separated into more than one module.

One or more of the described components of FIG. 1 can be maintained as a single proprietary system, a combination of proprietary systems, in the cloud, or a combination thereof. As one example, the offer and user-account database 140 in which information about chits or chits themselves are maintained can be maintained in the cloud or in a proprietary system. By maintaining the offer and user-account database 140 in the cloud, chits can be accessible to multiple devices. If a user has tagged content using a tablet device thereby creating or updating a chit, the updated chit can then be available to the user's smartphone. In this way, the user can then use the chit when travelling without the tablet device.

Outside of the offer entry tool 108, it is assumed that an administrator 106 is working directly with an advertiser 104 or other content provider. It is assumed that the administrator 106 will take care of preparing a "distribution-ready" copy of the chit which may involve minimal graphic arts skills such as changing logo size and resolution of logos and changing background colors, etc. In other embodiments, an administrator 106 can work indirectly with an advertiser 104 or other content provider. Furthermore, in yet other embodiments, interaction with an advertiser 104 or other content provider may be automated through other components or modules.

The interaction with the advertiser 104 or other content provider can include providing a manual for or other media to assist in creating the interactive ad which is supplied to the advertiser 104 so they know what information to provide, including such items as a company logo of certain size and format for chit; URL for a deal or offer; audio for the ad; a recommendation on how to mention "interactive ad" using the user app 144 so that app-users are cued properly to start and run the user app 144; deal or offer parameters; the period which a commercial needs to be maintained in the ad fingerprint database 122.

The offer entry tool 108 can have a user interface to support functions which can include interfaces to, among other things, enter new offer into the system (chit and audio); modify an existing offer; archive an old offer; delete an offer; query the system for list of active offers; query the system for list of expired offers; query the system for list of archive offers; query the system for list of ads by customer; and the like.

Furthermore, the offer entry tool 108 support functions which include, among others things, creating a unique ID for an interactive ad; updating and deleting meta-data (offer detail and unique Offer ID) to and from the offer and user-account database 140; updating and deleting ad audio and offer ID to and from the ad fingerprint database 122; generating lists (e.g., playlists, offer lists, etc.) for managing the system 100; and the like.

In some embodiments, a chit can comprise the following fields or sub-combinations of the following fields:
Logo
URL
Wallpaper/background color selection
Text for offer
Frequency & call sign & HD channel
Offer valid start date and time
Offer expiration end date and time
User's ID information
Does not return a voting result
Content-related information
Product-related information
Merchant-related information Still referring to FIG. 1, the embodiment shown includes a user account webpage 114 which can aid the administrator 106 in creating voting webpages. For a radio station 102 or other content providers participating in the program, voting webpages (one per station or provider) can be created. The webpage 114 can be made to be accessible by only the radio station 102 or provider. In other embodiments content providers may create or be assigned multiple webpages for different types of content or based on other criteria. For example, other criteria can include offer types, programs, etc.

As an example of a content provider's use of a webpage 114, a radio station 102 will pull up a webpage 114 then announce over the broadcast to the listeners how to respond to the survey. The listener/app-user would then start their user app 144 and press the voting button which will bring up the voting UI. When they press the voting button, the user app 144 will start recording the audio stream for use in station identification. This will be transparent to the app-user. The listener/app-user will then make their selection which may be a multi-click interface (press once if you agree or twice if you disagree) or red, yellow, green, blue button choice. The UI will be designed to be simple to use while driving. Devices on which a user app 144 can be run are discussed below in connection with FIGS. 6A and 6B.

As described above, the user app 144 can start as a result of a user interaction. In another embodiment, the user app 144 can automatically start based on the identification of an audible signal. For example, the device can be equipped with an application or device that detects an audible signal and, when the signal is detected, starts the user app 144. Such a listening device or application can be used to conserve battery power in the portable device at the same time as preventing a requirement that the listener/app-user start the user app 144 themselves or constantly run the user app 144. In yet another embodiment, the user app 144 may automatically start upon detection of embedded content, for example, RDS (Radio Data System) data, RDBS (Radio Broadcast Data System) data, or some other embedded content. In another embodiment, the user app 144 can be automatically terminated when the device or user app 144 detects an audio signal.

In yet other embodiments, the user app 144 can start automatically through the detection of both a signal detection and movement so that the user app 144 starts when a user is in a moving vehicle and has turned on a radio. In such an embodiment, the device on which the user app 144 runs can include an accelerometer and a pressure sensor. An accelerometer can be a GPS transceiver that detects geographic movement or some other location-movement detection component. A pressure sensor can be a component that detects pressure in the form of sound waves. The user app 144 or some other, related set of program instructions on the device can receive signals from both the accelerometer and pressure sensor to determine whether the user app 144 should start. In a preferred embodiment, the set of program instructions automatically start the user app 144 if signals from both the accelerometer and pressure sensor were at predetermined minimum values. For example, the user app 144 could start when the signal from the accelerometer indicates a speed or rate of change of geographic location of the device over a predetermined minimum. A predetermined minimum speed could be 10 mph. Further, the user app 144 could start when the signal from the pressure sensor detected a decibel level over a predetermined minimum. A predetermined minimum decibel level could be 60 dB. Moreover, the predetermined minimum values could be input by a user or set to defaults. Additionally, the set of program instructions could receive the type of sound waves to determine whether to automatically start the user app 144. For example, in a preferred embodiment, only when the audio detected by the pressure sensor was determined to be music with a predetermined level of certainty would the user app 144 automatically start. It is to be understood that other data can be consider in determining whether to automatically start a user app 144. For example, the device or user app 144 can be set to forbid the auto start or the auto start function can be further based on predetermined period of time, geographic location (e.g., within a radius or predetermined distance of a broadcaster, signal, or other point of interest). Furthermore, each input to determine whether user app 144 should automatically start can be further combined or separated. For example, the user app 144 can be set to automatically start based solely on an accelerometer signal, solely on a pressure signal, some other signal or input, or any combination thereof.

The automatic-on feature can be used in embodiments in which the device enables that app-user to tag content (i.e., vote, purchase, etc.) with one user action. In other embodiments, the device can comprise components, software, or both that can accept a single user action which both starts the user app 144 and tags the content. For example, an embodiment of the device includes a user app 144 that tags the audible content playing when the user app 144 starts. Thus, in effect, the content is tagged when the app-user starts the user app 144 with a single user action. In yet another embodiment, the device includes a user app 144 that automatically starts upon the detection of some audible content, embedded content, or some other triggering signal. For example, a unique and/or recognizable audible jingle can be detected to trigger the user app 144 or a radio-wave-based signal can be used. Thus, the user app 144 can be automatically launched when a sound is played. Such a sound could be unique to the system so that users would recognize it as related to the system. As another example, embedded content or some other triggering signal could be a portion or all of a digital signal transmitted with the broadcast content, including a digital signature or watermark.

In one embodiment, the user app 144 can be a lighter, more power-efficient user app 144 that only detects the triggering content and starts the user app 144. In another embodiment, the device can comprise a hardware or firmware component that detects the triggering content. Furthermore, the user app 144 provides the app-user with a user interface in which the app-user can perform a single user action to tag the content. The advantages of the single user action for tagging content include, among others, the ability to quickly tag content before the content ends. For example some content, including advertisements, can be short. Short content may prohibit an app-user from tagging the content were the app-user required to perform several user interactions to get to the tagging component or function.

A non-audio or non-audible signature, or watermark, can be embedded in the broadcast content or signal and can be used as a trigger. The content provider can create the watermark based on the content of the audio itself. For example, as described herein, a non-audible watermark can be based on the audible tone of the content. The watermark can also be based on information related to the audio content or content provider. For example, for a song, the watermark may be created from the artist's name, songwriter's name, song or album title, release date, label, etc. For other types of content, other information can be used. For example, for an advertisement, the name of the advertiser, product, or other offer-related information related to the advertisement can be used to create a watermark. The watermark can also be based on information related to the content provider, including the name of the broadcaster, the time the content was broadcast, or some predefined key value assigned to the content by the content provider or broadcaster. In yet other embodiments, a watermark can include a predetermined signal unrelated to the specific content in which it is embedded.

The content provider or broadcaster can embed a watermark into the broadcast signal. The device receiving the broadcast signal could then include a decoder to decode the broadcast signal to obtain the watermark. A watermark can include information that can be detected to trigger a user app 144 or that can be decoded into audible or non-audible content or content that can be decoded into some other medium. For example, a watermark can be decoded into textual data for display by the user device, graphical data for display by the user device, or video for play by the user device. Different algorithms can be used to embed a watermark signal in broadcast content. Such algorithms include least significant bit (LSB) coding, phase coding, phase modulation, echo hiding algorithms, spread spectrum algorithms, and others. Those of skill in the art can appreciate that different watermarking algorithms exist and can be used to embed watermarking signals.

Returning to the embodiment of system 100 shown in FIG. 1, when the vote is cast, the vote and the audio snippet are sent to the offer ID server 128. The offer ID server 128 will identify the radio station, other broadcaster, or other content provider. As the message includes a vote, the offer ID server 128 will not need to check the playlist. The offer ID server 128 will check the offer and user-account database 140 to get the information for that radio station 102 or content provider so that it knows what web address to send the vote to.

The offer ID server 128 can then return a chit to the portable device XXX and app-user saying "thank you for voting on station XXXX at YY.Y MHz" or some other message. In this embodiment, the chit will not contain any information on the vote outcome or what the vote was about. The chit for that radio station 102 will be stored in the offer and user-account database 140. Chits or chit information for use by user devices can be stored on the user device XXX, in the offer and user-account database 140, or some other external database. In this way, chits can be accessed by other devices owned or operated by the user.

A voting account creation tool can be implemented as part of the user account webpage 114 for the administrator 106 and can be used to set up an account for a radio station 102 or content provider with a user name and password login; set up a webpage for a radio station 102 or other content provider (e.g., HD1 has a different webpage than HD2, including username and password. In other embodiments, multiple webpages can be setup for a content provider based on the type of content or some other criteria.); resetting passwords; deleting an account for a radio station 102 or other content provider or user; storing account information in the offer and user-account database 140 (including ID for the radio station 102 or content provider, website address; username, password, voting response messages, and the like); and the like.

The voting webpage 112 by the radio station 102 or other content provider can include the functions for administering the information for the radio station 102 or other content provider and setting up voting page information (e.g., start and stop voting button, running tally in the one-click box and the two-click box until the stop button is pushed, voting percentages and totals).

Referring still to system 100 shown in FIG. 4, the data mining tool 116 effectively can be a tool to query the databases for information and format that data as a series of reports. These reports can be tailored to the various users of the system including the administrator 106, the advertiser 104, the vendor 110, the app-user or other users or consumers of data, and the like.

In web server 130, traffic generated by the system 100 can be monitored. For example, a chit may have an active hyperlink to a vendor 110 website where the app-user can get more information. The link can be configured to always go to a redirection site so that web traffic can be monitored. The data from these redirections can be stored in the offer and user-account database 140 for traffic related to offers (e.g., statistics related to offers sent, responded to, fulfilled, and the like) and user activity.

In some embodiments, the system 100 includes a vendor redemption tool 120. The vendor redemption tool 120 can be used to insure that a coupon-like offer is only redeemed once. It can also provide a feedback mechanism so that the offer and user-account database is updated with information about which offers are still valid, still available, consumed, and the like.

Each coupon or offer can be issued a unique redemption codes. Therefore, redemption codes can be trackable by the user or device. If a user transfers a chit to another user, a new unique redemption code can be created for the other user. Information about the transfer likewise can be uploaded or otherwise transferred to the new user's account database, offer ID database, or other database for tracking, including consumption. The vendor redemption tool 120 can communicate to the server the new redemption code, and an indication that the redemption code is valid. The vendor redemption tool 120 also can include protection against counterfeit coupons or offer information. At least in part, the creation of unique redemption codes can offer this protection.

The vendor redemption tool 120 can be a web-based application that allows the user at the redemption site to mark off people that have redeemed their coupon-like offer. When marked off, the information can be written to the offer and user-account database 140. Other embodiments of the vendor redemption tool 120 can be implemented as client-server applications. In other embodiments, the tool can be implemented so that data indicating the redemption for the user is automatically updated to a database. In one embodiment, another offer can be generated and presented to the user through the user's device where the other offer is relevant to the redeemed offer. For example, the other offer can from the same vendor as the redeemed offer, from a competitor, or for a related product.

Also to support this feature, hardcopies will be provided to the vendor 110 in case there is Internet connectivity issue. The vendor 110 is expected to enter the used coupon-like offers to the system at a later time as that is how they are paid. In one embodiment, the vendor redemption tool 120 can include automation through, for example, a web application, for a vendor 110 to enter used offers.

Referring still to FIG. 1, fulfillment services 118 include the ability to get music or digital media from iTunes, Amazon, other online music store and return it to the app-user. Fulfillment services 118 also include the ability to request a physical item be delivered to a user from a vendor 110 and support the cash transaction. In one embodiment, fulfillment services 118 provides the seamless purchase or fulfillment of content delivery. For example, the app-user, by tagging the content can effectively tag and purchase the content in one step. In this way, the app-user need not interact with multiple entities to receive content or products or take advantage of offers.

Methods for Identifying Content and Content Providers:

The smartphone or portable device can use various methods to extract information from the content which the app-user will tag. In one embodiment, the portable device can obtain embedded content from the broadcast content, the embedded content providing an identifier for the content. The embedded content can also be used to identify the content provider, such as the broadcaster, vendor 110, advertiser 104, or other sponsor of the content, information about the provider such as radio frequency, call letters, nickname, and the like, type of content, title of the content, copyright information, time the content started, length of the content, information about the author or performer of the content, information about the owner, publisher, or label of the content, and any offer information related to the content, such as price, reduced price, coupon, ticket or ticket information, location, time limit, and the like. Embedded content can include RDS data, RDBS data, or the like along with the content, that data including. Such embedded content can be received by the portable device from a radio via Bluetooth, another radio-wave-based transmission protocol, or some other transmission technique. For example, in one embodiment, the radio or other device receiving the broadcast could transmit identifying data from embedded content over IP. In yet another embodiment, the device receiving the broadcast could retransmit, over a radio frequency, the embedded content for reception by the portable device. Embedded content can also be transmitted over a wired communications like as well as wireless.

Devices that receive and play content can comprise Bluetooth transceivers, wireless or wired network interface controllers, or some other communications protocol transceiver configured to transmit identifying content as described above and receive information back from the portable device. For example, the portable device can include software, hardware, or both to transmit to the device playing the content information about the user or voting and tagging information in response to tagging. As explained above, the device playing the content can use this information to receive content or otherwise interact with system 100 and the portable device.

In another embodiment, the smartphone or portable device, rather than obtaining content information from another device, can combine the content or representation of the content, time, and location of the portable device, for example, by a GPS or other PDS component, and then send that information to a database that includes a record of broadcasters or content providers available by broadcast at the portable device's location and the content which those providers broadcast. Such information can include the GPS coordinates or other location information of the portable device. The system 100 can include a module to match the data from the portable device against the records of content providers and content to determine the content the app-user intends to tag, the content provider, or both. For example, location information can be associated with content providers and where the location information from the portable device falls within the location information for a content provider, a possibly match is found. Information about the content, for example, from a fingerprint of the content, can be matched to a smaller set of potential content providers, thereby increasing the likelihood of matching the content and content provider to the content that the user tagged. In one embodiment, the portable device can send the data in real time to the system 100 for matching, for example, over IP. In another embodiment, the device can send the data via text messaging or otherwise via a communications network. In yet another embodiment, the portable device can save the data to upload to the system 100 at a later time. Transmission of the data over the various communications methods can be accomplished automatically or at the request of the app-user.

In another embodiment, the smartphone or portable device can obtain information from a content provider system to identify information being played. For example, the portable device can receive information from a broadcaster's broadcast management system to identify content where the broadcaster and time are known. Information from a broadcast management system can be obtained over IP communications, radio-based communications, or some other communications method.

Figure 6A:
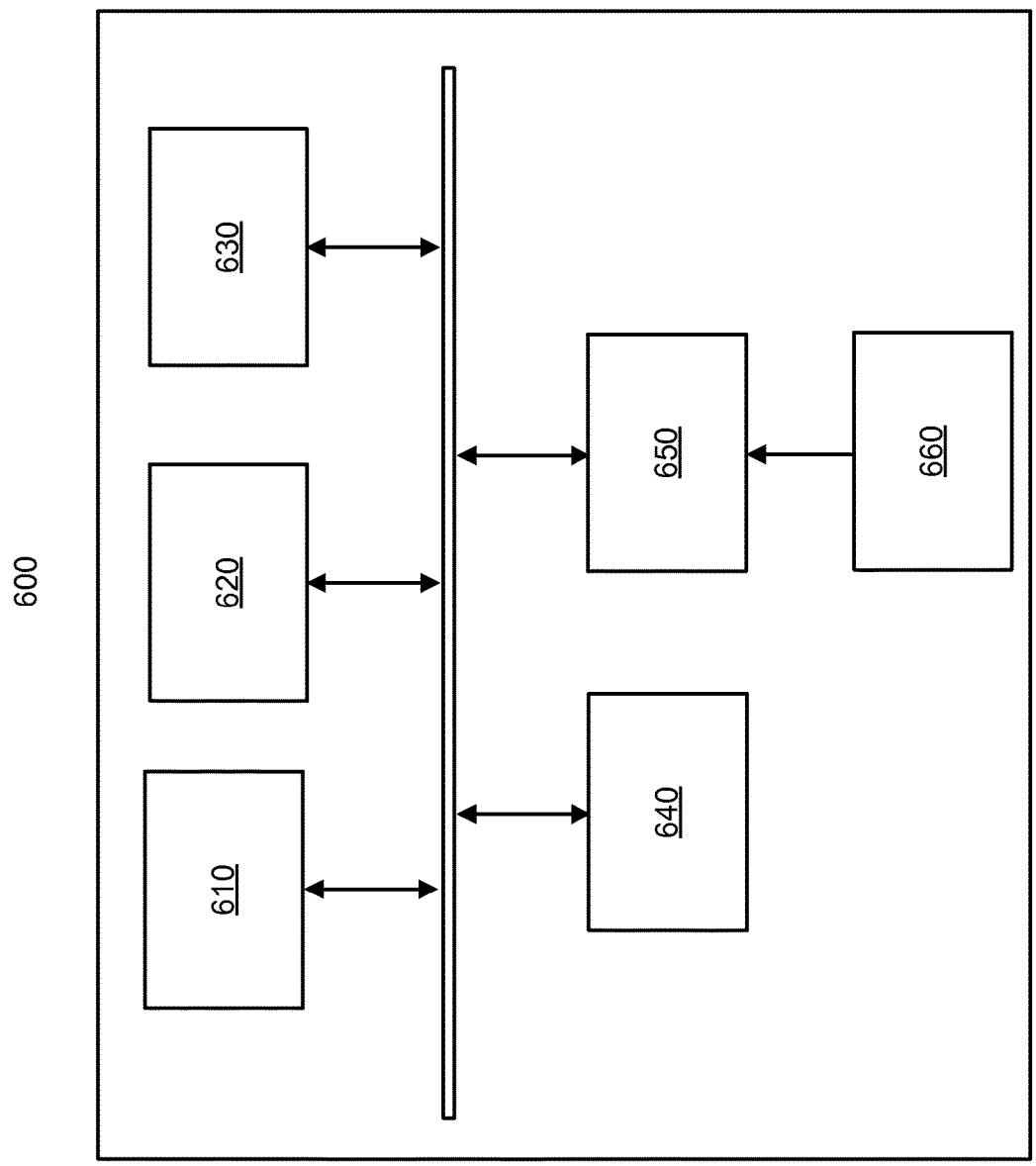
FIGS. 6A and 6B are block diagrams of portable user devices that can be used with a system in accordance with an illustrative embodiment of the invention.
Figure 6B:
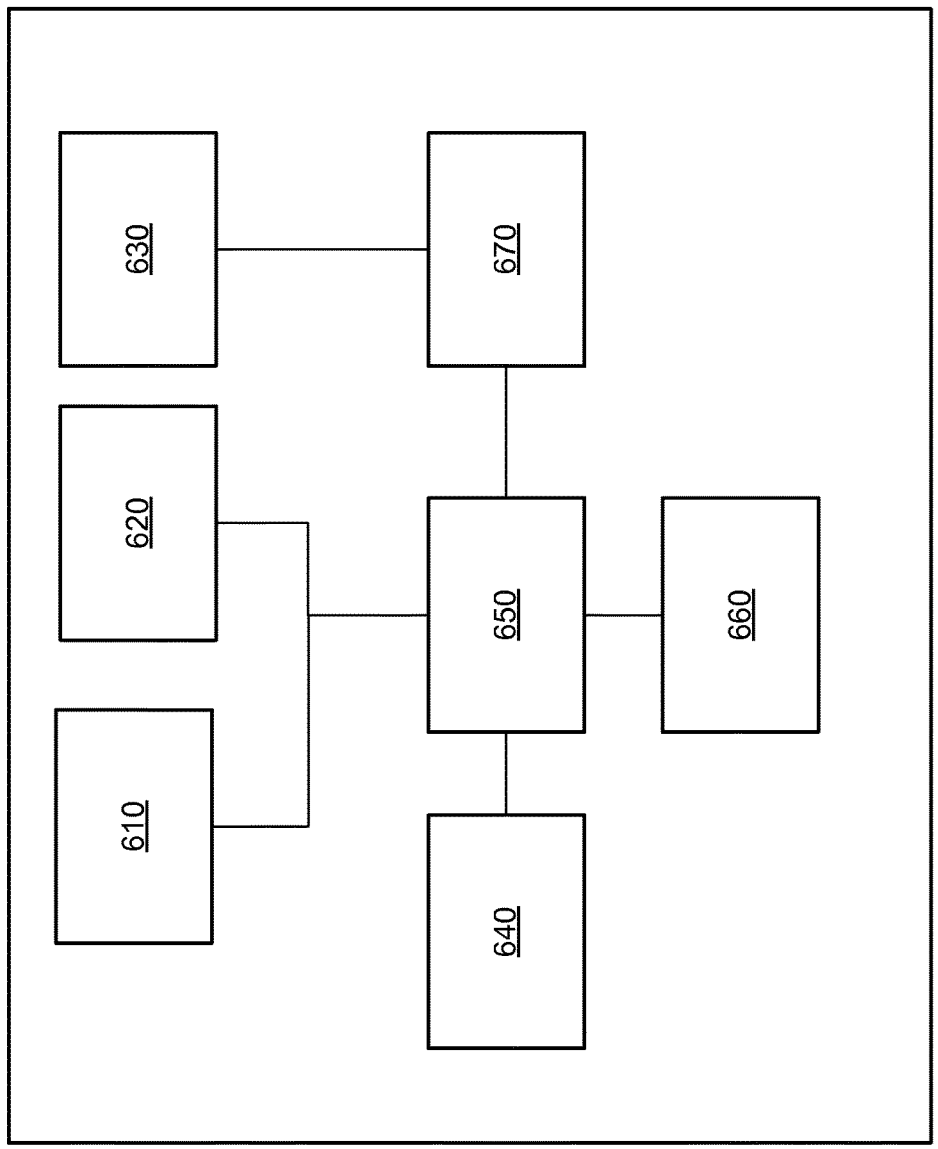

Referring now to FIGS. 6A and 6B, illustrations of embodiments of a smartphone or portable device that can be used in carrying out the invention are shown. The portable device 600 can include a processor 650 and a Bluetooth transceiver 620 through which embedded content or other content can be shared with other devices as described herein. The device 600 also includes a GPS receiver 610 through which the device's 600 location can be obtained. The device 600 also includes a communications transceiver 630 through which identifying information can be sent to the system 100.

Figure 7:
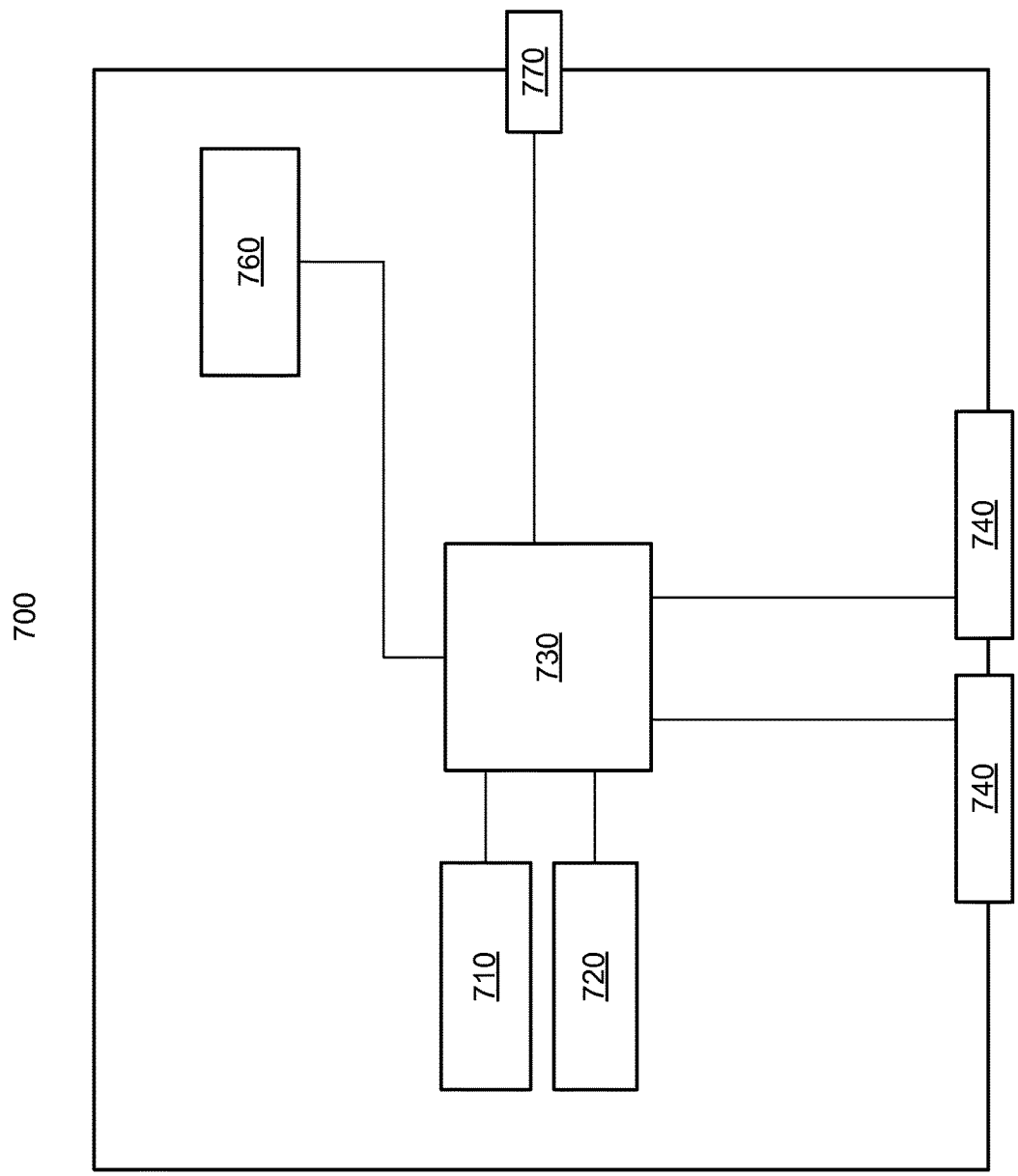
FIG. 7 is a block diagram of a broadcast device that can be used with a system in accordance with an illustrative embodiment of the invention.

Device 600 also includes a battery 660 through which the device 600 and its components receive power and a memory 640 which can contain instructions for operating the device 600 and its components as well as program instructions for user app 144. The embodiment illustrated in FIG. 7 should not be construed as limiting. For example, other devices may include a radio receiver that can receive radio broadcasts, including embedded content which can then be used for tagging and identifying content and content providers as described herein. Also, such devices can include other components to enable other functions described herein and other functions of portable devices such as smartphones, digital music players, PDAs, GPS devices, and other portable devices. Furthermore, the architecture of the above portable devices should not be construed as limiting. For example, several components may be coupled indirectly through a bus, directly as shown, or in some other configuration.

Referring to FIG. 6B specifically, an illustration of a different embodiment of a device 601 is shown. Here, device 670 includes a communications processor 670 so that instructions for operating communications through the communications receiver 630 are offloaded at least in part from processor 650. Those of skill in the art can appreciate that a device 600, 601 can be a smartphone, other portable device, such as a tablet or laptop, or non-portable device which is capable of operating a user app 144 as described herein.

In FIG. 6, an illustration of an embodiment of a broadcast device 700 that can communicate with a smartphone or other portable device is shown. The embodiment shown could be any of the broadcast devices described herein and should not be construed as limiting. For example, the broadcast device 700 can have additional components or a subset of the components shown. A broadcast device 700 can have a wireless communications controller for receiving wireless broadcasts including satellite or IP-based broadcasts. The below broadcast device 700 includes a processor 730 and a tuner 720 to receive a broadcast signal, a memory 710, and audio speakers 740, 750. It also includes a Bluetooth transceiver 760 with which it can communicate embedded content from the broadcast content to the portable device 600, 601. This can enable a user app 144 on the portable device 600, 601 to identify content to the user for informational purposes, tagging purposes, and other consumer-decision purposes. The Bluetooth transceiver 760 may also receive information related to tagging content as described herein. The Bluetooth transceiver 760 can also operate as a traditional Bluetooth device, for example, for mobile communications.

The broadcast device 700 also includes a USB connector 770 through which it can communicate embedded content to the portable device or for other communication purpose. For example, content may be transferred between the broadcast device 700 and portable device 600, 601. Other modes of communication can be used including IP-based, infrared, or other radio-based communications. The memory 710 of the broadcast device can be a memory to store content that is received from the portable device 600, 601 or content that is received from a content provider, the system 100, or some other source of content. The broadcast device 700 can include a communications interface so that it can receive content for streaming or storage for later playback. Such other communications interface can be wireless or wired and can use IP-based, radio-based, infrared, or some other communications method to receive the content. For example, the broadcast device 700 can include a wireless Ethernet controller that can connect to the Internet in order to download content from the system 100, the content provider, content retailer, or other source that the user has tagged and can then be played back on the broadcast device.

The benefits of the foregoing methods of obtaining identifying information about content include the ability to avoid fingerprinting technology and to avoid the need for large databases of content against which fingerprints or signatures are matched. However, the system 100 can take advantage of improved fingerprinting technology that more accurately identifies content. Further, improved fingerprinting technology can be used to identify content other than a limited number of published song recordings.

For example, in one embodiment, the portable device 600, 601 can include components, software, or both for an improved technique to create a signature of the content. The portable device 600, 601 can create the signature by processing the audio of the content. In one embodiment, signatures are computed in real time. In another embodiment, signatures are computed in near-real time. The system 100 can include a library of possible signatures against which the signature from the portable device is matched. Such a library can be compiled and updated before the content is played. For example, in one embodiment, content providers might also provide signatures using the same technology or other technology that yields the same signature that the portable device would create. In yet another embodiment, the system 100 may create signatures by receiving the content from the broadcaster or content provider and creating a signature in real or near-real time. In another embodiment, the library can be built from the signatures received from the portable devices.

The library in the system 100 can be transient in that signatures of content from content providers can be received and stored close to the time at which the content is aired. After a predetermined period of time has passed, the system 100 can purge old signatures. This is possible because app-users tag content while content is aired. Therefore, old content will not be tagged. In one embodiment, the system 100 allows app-users to tag content after the content has aired. For example, an app-user may not have a communications available via the device at the time the content is aired. For this reason, it can be desirable for the system 100 to maintain signatures for a predetermined period. Here, the predetermined period can be twenty-four hours. In another embodiment, the predetermined period of time can be as short as a few minutes. In yet another embodiment, the predetermined period of time can be based on the content type. For example, the predetermined lifetime of programs that air multiple times can be until during or after the last airing of the program. In this way, the signature need not be purged and restored multiple times. As another example, the predetermined period of popular songs that are played with a predetermined frequency can be indefinite. When the frequency with which the song or content falls below the predetermined frequency, the predetermined period of time can be set as it is for other songs or content. For example, a song or content that is played five or more times a day can be given a "HOLD" indicator or the predetermined period can be "NULL" or some other meaningful value so that it is not purged. In other embodiments, the frequency can be 10 airings a day. The predetermined frequency can depend on the number of broadcasters or content providers, the size of the library, and the variance of the types of content.

In one embodiment, the system 100 can include components or modules to "listen" to broadcasts and generate signatures in real or near-real time of the aired content. The system 100 can then store those signatures, as well as information about the content provider (e.g., broadcaster), for matching against signatures of tagged content and/or broadcaster information sent by devices.

The library can support the storage of standard audio files, for example, .WAV files that hold the signatures. In another embodiment, the library can support other, custom audio files. In yet another embodiment, the library can support non-audio signatures in which the data in the signature is a digital, non-audio representation of the signature. The audio types for which signatures can be created and used within the system 100 can include music, advertisements, spoken content, or some other type of audio broadcast or otherwise transmitting by a content provider.

Following is a description of one embodiment of fingerprinting. Sound is created by vibrating objects. A vibrating object causes pressure variations in the air which propagate outwards as waves. These sound waves are converted into neural impulses by the ear and perceived as sound by the brain.

Musical tones have four major characteristics:
1. Pitch: the frequency of the vibration. The higher the frequency the higher the perceived pitch.
2. Intensity: the loudness of the tone.
3. Duration: how long the tone lasts.
4. Timbre: the "quality" or "color" of the tone. Different instruments sound different, even when they play the same note; timbre captures this concept.

A pure tone is a vibration at only a single frequency. However, the notes played by real musical instruments are not pure in this sense. When a given note is played by an instrument, vibrations at several frequencies are simultaneously present. These extra frequencies are multiples of the fundamental frequency, and are referred to as harmonics. So a viola playing the note "A" will simultaneously cause vibrations at 440 Hz, 880 Hz, 1320 Hz, etc. The timbre of a tone is largely determined by the relative distribution of energy in the harmonics. Different energy distributions (i.e., different relative intensities of the harmonics) are perceived differently by the brain: so a violin and a trumpet sound different. The distribution of a waveform's energy as a function of frequency is called a spectrum.

Figure 8:
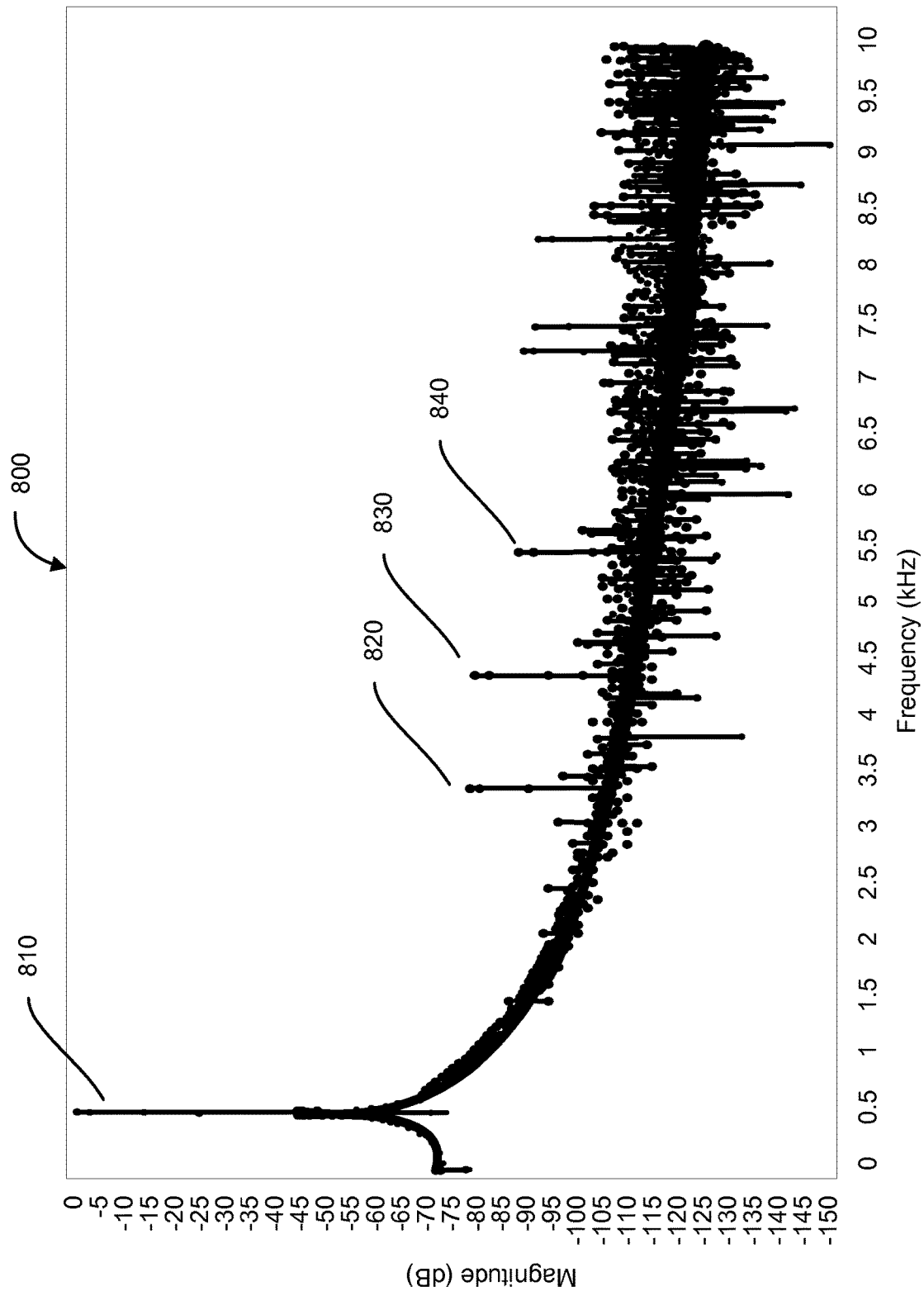
FIG. 8 is a graph depicting a spectrum created from processing audio stream content in accordance with an illustrative embodiment of the invention.

There are mathematical tools for analyzing a waveform to determine what frequencies compose it. The Discrete Fourier Transform (DFT)—which can be efficiently computed using an algorithm referred to as the Fast Fourier Transform (FFT)—is one such tool. FIG. 8 illustrates a graph 800 showing the spectrum of a pure 500 Hz tone.

There is a large spike 810 at 0.5 (the x-axis units are in KHz, so this is 500 Hz) which corresponds to the pure sine wave tone. The other "spikes," including spikes 820-840, are at least 70 dB down relative to the main spike 810, meaning that they are many times smaller in intensity (−10 dB is a factor of 0.1, −20 dB a factor of 0.01, −30 dB a factor of 0.001 and so on). These smaller spikes 820-840 are the result of noise.

Figure 9:
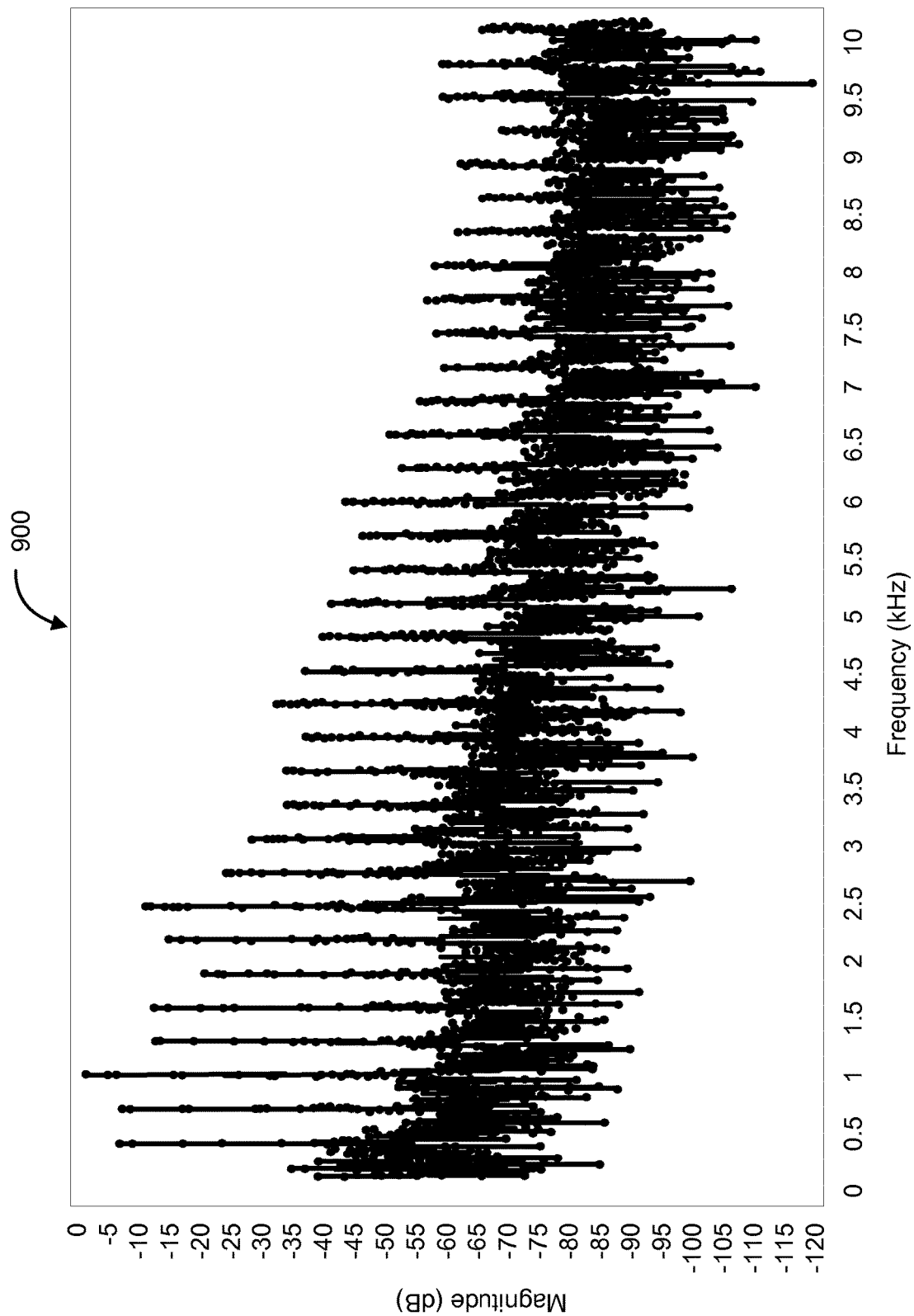
FIG. 9 is a graph depicting a spectrum created from processing audio from a viola in accordance with an illustrative embodiment of the invention.

FIG. 9 illustrates a graph 900 showing a spectrum of a viola playing a note. Data for the waveform for this note was captured with a microphone connected to a PC and was then analyzed using the FFT.

One of skill in the art can appreciate that in graph 900 many harmonics are present, each with a different intensity, yielding the viola's unique timbre.

Figure 10:
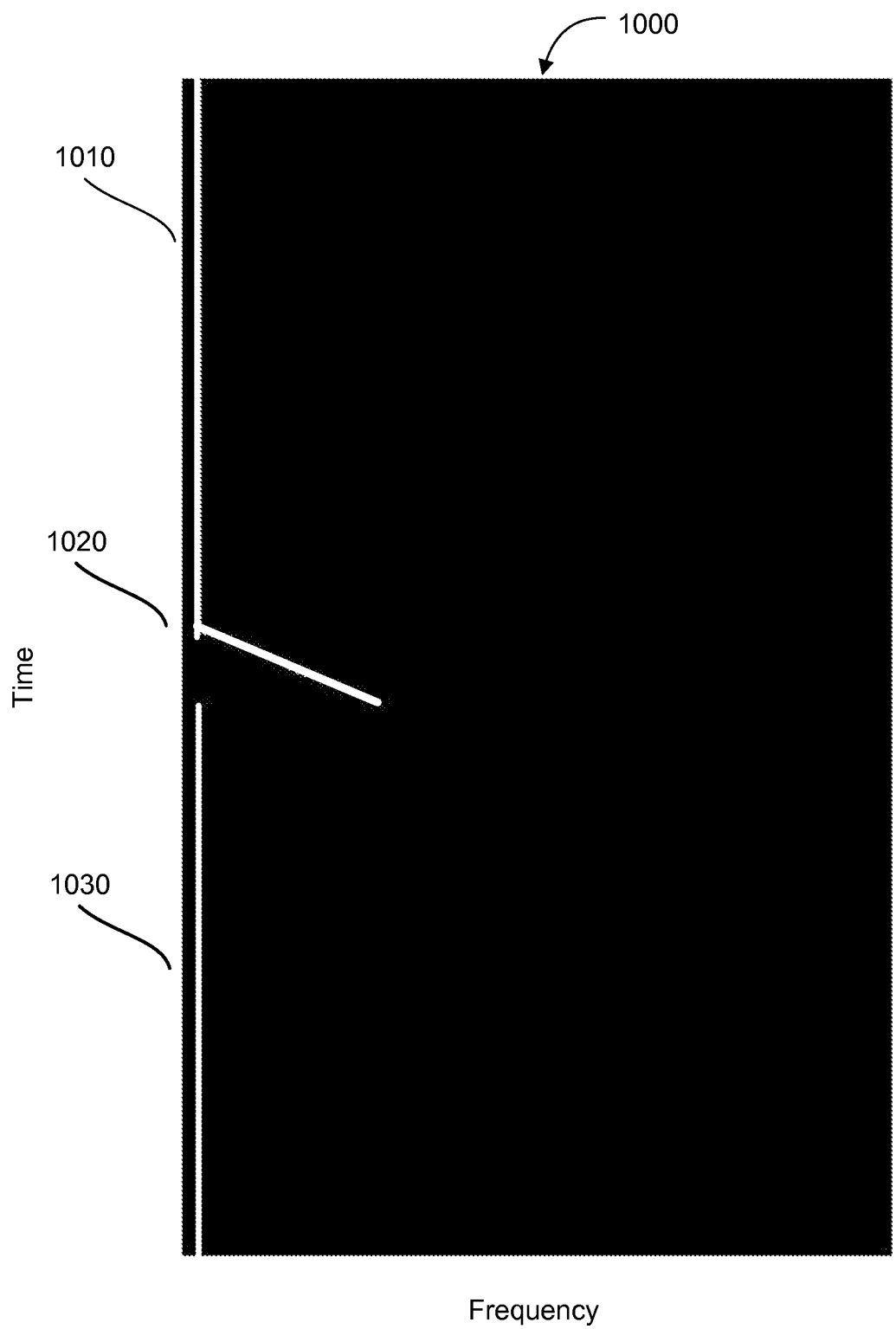
FIG. 10 is a spectrograph created from processing audio in the form of a pure tone in accordance with an illustrative embodiment of the invention.

In music, the note being played changes over time, and multiple instruments are often playing together simultaneously. It is therefore useful to look at how the spectrum of a waveform changes over time. A spectrograph is a visual representation of how the spectrum changes over time (spectrographs are sometimes called spectrograms as well). The top of a spectrograph is "time zero" and time increases as you move down the spectrograph. In other words spectrographs can be read top to bottom like a book. The left of the spectrograph corresponds to low frequencies and the right to high frequencies. The brighter a point on the spectrograph, the greater the intensity of the frequency at that instant in time. Consider the spectrograph shown in FIG. 10. This spectrograph 1000 corresponds to a pure tone 1010, followed by a frequency ramp 1020, followed by a return to the pure tone 1030.

Figure 11:
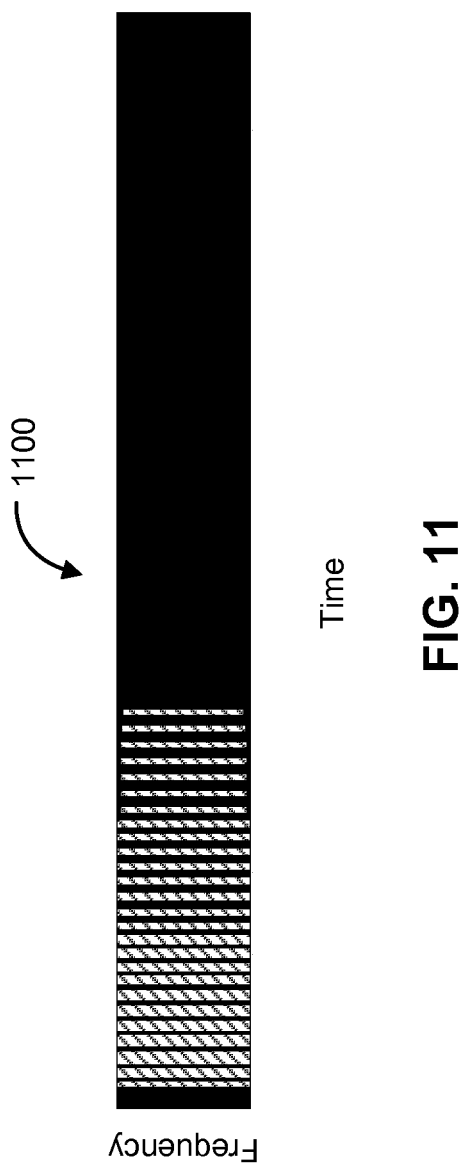
FIG. 11 is a spectrograph created from processing audio from a viola in accordance with an illustrative embodiment of the system.

The vertical length of the pure tone 1010 indicates that a pure tone is present for a period of time. The slanting line 1020 indicates that the frequency increases with time for a while (remember, time increases as you move down the graph and frequency increases to the right). Eventually, the frequency ramp ends and the pure tone is resumed at the vertical length of the pure tone 1030. FIG. 11 illustrates a spectrograph 1100 for the viola playing the note whose spectrum is illustrated in FIG. 9.

Spectrograph 1100 illustrates that many frequencies are present and that they are more intense at the lower frequencies (the vertical stripes are whiter on the left); all the frequencies persist for the entire duration that the note is played. Also, the frequencies are constant for the duration of the note (the lines are straight).

Figure 12:
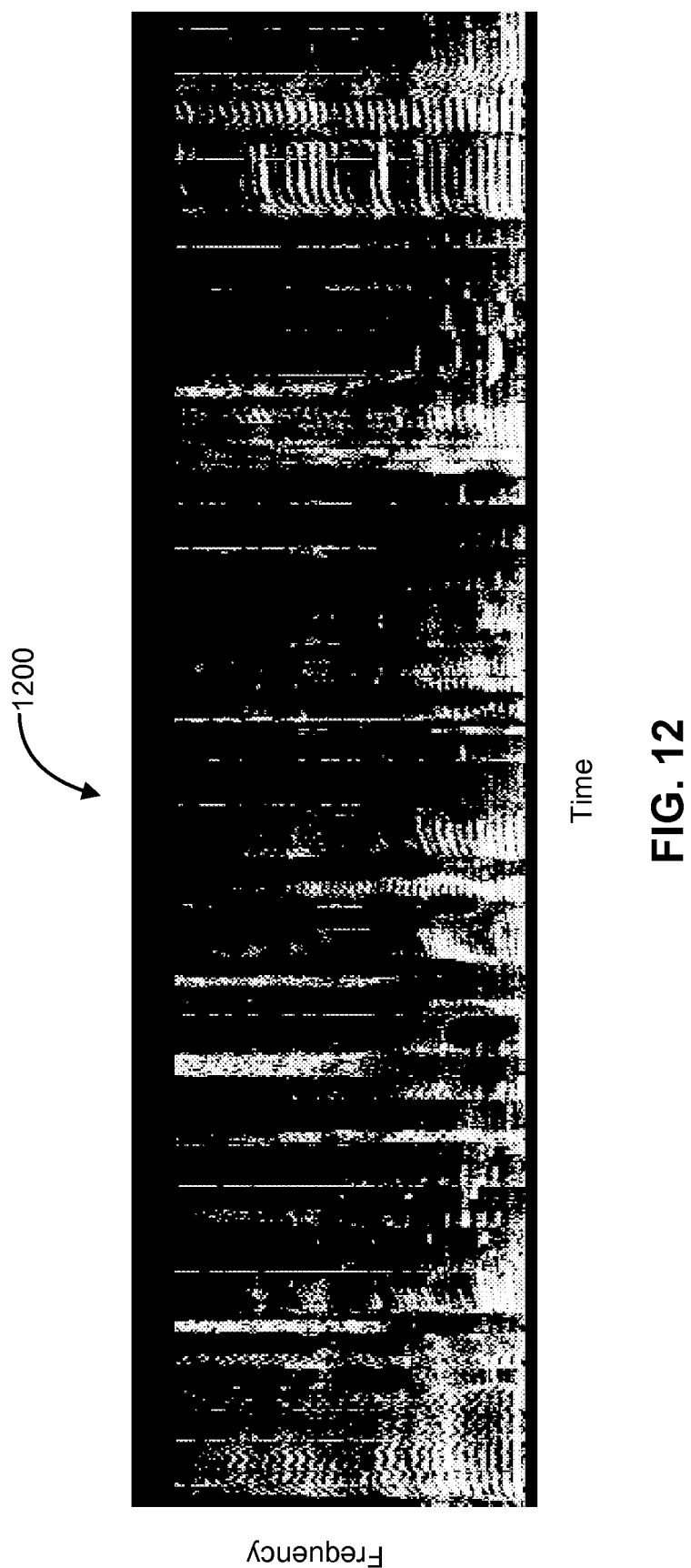
FIG. 12 is a spectrograph over a several second period from the song "Fly Me to the Moon" created in accordance with an illustrative embodiment of the system.

Of course, the spectrograph of music can be quite complex. For example, FIG. 12 shows a spectrograph 1200 over a several second period from the song "Fly Me to the Moon" by Frank Sinatra.

Figure 13:
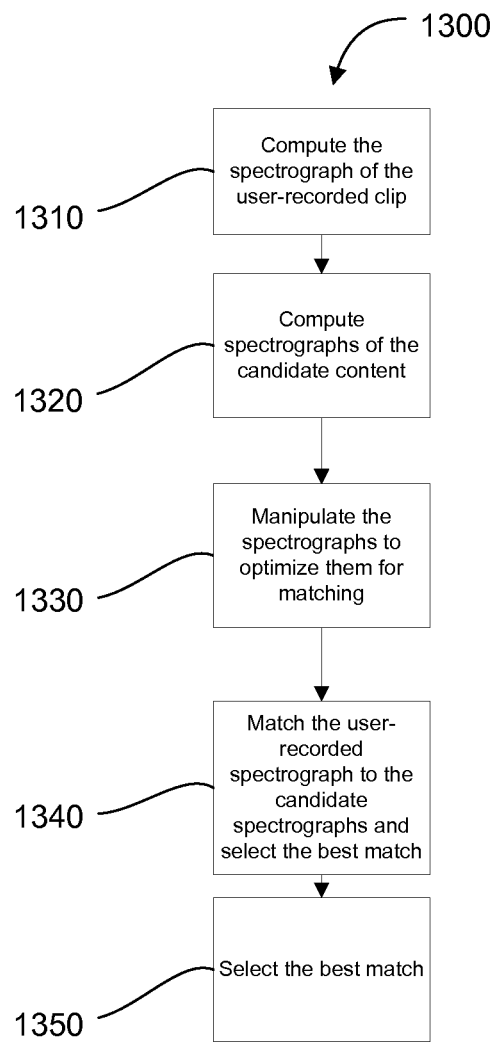
FIG. 13 is a flowchart of a method for matching audio content spectrographs in accordance with an illustrative embodiment of the invention.

FIG. 13 illustrates a method 1300 for matching a user-recorded clip to a song in accordance with the spectrograph descriptions above. At step 1310, spectrograph of the user-recorded clip is computed. In a preferred embodiment, 1024 point FFTs are used and the audio is assumed to be recorded in mono. In other embodiments, the audio can be recorded in stereo. A conversion from or to mono or stereo can be included in this step. For audio sampling at 44.1 KHz (the CD standard) this means that 43 spectra are computed each second, one every 23.3 ms. At step 1320, spectrographs of the candidate songs are computed. In a preferred embodiment, the candidates are assumed to be in stereo and are converted to mono before their spectrographs are computed.

At step 1330, the spectrographs are manipulated to optimize them for matching. In a preferred embodiment, for each spectrograph filter out (by setting the FFT coefficients to zero) all frequencies less than 300 Hz and greater than 8 KHz. This is done to eliminate low frequency and high frequency noise that might disturb the matching algorithm. During filtering, data representing energy at higher frequencies is removed. Also, each spectrograph can be normalized so that the highest power present at any frequency at any point in time maps to 0 dB. This normalization allows waveforms at different volumes to be matched to each other. Furthermore, the spectrographs can be scaled such that any energy at −25 dB or below maps to black, 0 dB maps to pure white, and values between −25 dB and 0 dB are linearly stretched over the grayscale from black to white. Scaling the spectrographs in this manner forces the matching process to only consider frequency content that is within 25 dB of the peak energy in the spectrograph.

At step 1340, the user-recorded spectrograph is matched to the candidate spectrographs. Note that the quality of the match can be expressed in terms of a Peak Signal to Noise Ratio (in dB) as opposed to mean square error. This is done for ease of data presentation. In a preferred embodiment, candidate segments are assumed to be longer than the user segment. Further, for each candidate segment, the user spectrograph can be overlaid on top of a candidate spectrograph (starting at the top). The formula applied is the following (it computes the Peak Signal to Noise Ratio in dB):

$$PSNR = 10\log\left(\frac{255^2}{\text{average mean square error}}\right)$$

In a preferred embodiment, for each candidate spectrograph, starting at the top, overlay the user spectrograph. It will only cover a portion of the candidate spectrograph as the candidate is longer in time than the user clip. In a preferred embodiment, the mean-square error between the two is computed and stored. Further, in some embodiments, the user spectrograph is moved down by one row with respect to the candidate and the mean-square error for this position is computed and stored in a database or in memory by a component of system 100. This portion of step 1440 can be repeated until the entire candidate spectrograph has been searched. In other words, the user spectrograph can be "slid vertically down" the candidate spectrograph, one line at a time, so that a match can be searched. At each repetition, a PSNR can been computed for every offset. The result of this process is a PSNR trace. Each trace can show how the PSNR varies as the user spectrograph is slid through the candidate spectrograph.

At step 1350, the best match is selected. Once all the candidates have been searched, the candidate which exhibits the point with the smallest mean-square error can be selected as the match. Some action can be taken based on this declaration of a hit. For example, content can be purchased, coupon or offer can be sent to the user or user app 144, notify the advertiser, record the hit in the offer and user-account database, and the like.

In one embodiment of the system, the a component of the system 100 (e.g., playlist generator 126) can compare a user recorded clip to various candidate clips. The spectrograph approach outlined above is one candidate for how this can be done. Accordingly, the following basic process can be applied:
1. Compute a signature for all the candidates
2. Compute a signature for the user's clip
3. Match the user's signature to the candidate signatures
4. Declare a "hit" based on the result of the matching algorithm and take some action (order a song, dispatch a coupon to the user, notify the advertiser, etc.)

Advantages of the spectrograph approach of method 1300 include effectiveness when matching is performed against a large set of songs and in noisy environments. Noisy environments can include open-air environments, noisy rooms, moving vehicles, and the like.

In another embodiment, a rule can be adopted that in order for a match to be declared at step 1350, the PSNR of the peak must exceed the peak PSNR of all alternative candidates by some threshold. If it does not do so, the algorithm can return a "match failed" value.

In yet another embodiment, the nature of where the peak PSNR occurs can be characterized, i.e., to determine how sharp it is. When a peak PSNR is not relatively high or "sharp," this suggests that the confidence of a match can be gauged by the sharpness of the highest peak in a PSNR trace. The height or sharpness of the peak in the PSNR trace can correspond to the likelihood of a match. Furthermore, it is possible to identify a matching trace based purely on peak sharpness even when some other candidate match exhibits an overall higher PSNR value.

Various measures of peak sharpness are possible. One such measure includes the following:
For a given trace, find the peak PSNR point. Consider this point to occur at an offset of "0". Let the peak value in the trace be PSNR(0), the value just to the left of the peak be PSNR(−1), the value just to the right of the peak be PSNR(1), etc.
Compute the peak sharpness function as follows:

```
lp = rp = 0;
for(i = -N; i < 0; i++){
    if( PSNR(i+1) > PSNR(i) ) lp += (PSNR(i+1) - PSNR(i))^2;
    else lp -= (PSNR(i+1) - PSNR(i))^2;
}
for(i = 0; i < N; i++){
    if( PSNR(i+1) > PSNR(i) ) rp -= (PSNR(i+1) - PSNR(i))^2;
    else rp += PSNR(i+1) - PSNR(i))^2;
}
if( lp < rp ) metric = lp;
else metric = rp;
```

Note that in the above pseudocode we consider N pairs to the left of the peak and N pairs to the right of the peak for some N. For a sharp peak, all the pair differences to the left of the peak yield positive values and all the pair differences to the right of the peak yield positive values too, because the peak increases monotonically and decreases monotonically. For a non-sharp peak some pairs may cause lp (or rp) to decrease because the peak is not monotonic. Furthermore, for a sharp peak, the peak rises substantially with respect to its overall background value, increasing the value of lp and rp. We then choose as our peak sharpness measure the smaller of lp or rp. The smallest value is chosen since large lp or rp values can be obtained by a steep rise in the PSNR curve to a stable value or by a steep drop in the PSNR curve from a stable value. In other words, we require both the left and right values (lp and rp) to be large in order to have a sharp peak.

In one embodiment, where ambient noise may otherwise interrupt the content signature, a match can still be determined based on a predetermined ratio of the highest peak sharpness found to the second highest peak sharpness found. For example, a threshold on the order of 10 can be reasonable: i.e., if the highest peak sharpness measure found exceeds the second highest by a factor of at least 10, then a match can be declared. Otherwise, a match is not declared. Note that the size of this ratio is a measure of the confidence that a correct match is found. In yet other embodiments a ratio in which the highest peak sharpness exceeds the second highest by a factor of 5 may determine a match.

What is claimed is:
1. A method comprising:
receiving, at a server, an ambient radio station audible audio transmitted by a mobile device that received the ambient radio audible audio at a microphone of the mobile device;
sampling, by the server, audible audio from a plurality of radio stations;
identifying, by the server, a radio station identifier (ID) associated with the ambient radio station audible audio using a comparison of the ambient radio station audible audio to said audible audio from the plurality of radio stations;
determining, by the server based on a timestamp of the ambient radio station audible audio and the radio station ID, a unique identification for a purchase of a non-audio item that corresponds to information embedded in the ambient radio station audible audio, wherein the unique identification for the purchase of the non-audio item is specific to a user of the mobile device; and
transmitting, by the server, the unique identification to the mobile device to enable the user to purchase the non-audio item using the mobile device.

2. The method of claim 1, wherein said sampling occurs at predetermined intervals.

3. The method of claim 1, further comprising:
receiving, by the server, current location data of the mobile device, wherein said identifying the radio station ID is further based on the current location data of the mobile device.

4. The method of claim 1, further comprising:
receiving, by the server, user data associated with the mobile device; and
transmitting, by the server, the user data associated with the mobile device to a radio station server associated with the radio station ID.

5. The method of claim 1, further comprising:
detecting, by the mobile device, any of:
measured audio over a predetermined minimum decibel level;
ambient audio that meets a predetermined level of certainty to be music;
a triggering audio signal with predetermined audio characteristics;
an indication from an accelerometer of the mobile device that a speed of the mobile device is over a predetermined minimum;
an indication from a GPS of the mobile device that rate of change of geographic location is over a predetermined minimum; or
a combination thereof;
in response to said detecting, automatically activating, by the mobile device, a station identification application; and
recording, by the station identification application, the ambient radio station audible audio.

6. The method of claim 5, wherein said detecting includes at least two of:
measured audio over a predetermined minimum decibel level;
ambient audio that meets a predetermined level of certainty to be music;
a triggering audio signal with predetermined audio characteristics;
an indication from an accelerometer of the mobile device that a speed of the device is over a predetermined minimum; or
an indication from a GPS of the mobile device that rate of change of geographic location is over a predetermined minimum.

7. The method of claim 5, further comprising:
transmitting, by the mobile device, user data associated with the mobile device to the server;
receiving, by a user interface of the station identification application, a single user input in response to a prompt within the ambient radio station audible audio; and
transmitting the user data associated with the mobile device and the single user input to a radio station server associated with the radio station ID.

8. The method of claim 5, further comprising:
transmitting, by the mobile device, user data associated with the mobile device to the server;
displaying, by a user interface of the station identification application, a media content based on the ambient radio station audible audio;
receiving, by a user interface of the station identification application, a user input in response to the media content; and
transmitting the user data associated with the mobile device and the user input to an external server determined based on a content of the user input.

9. The method of claim 1, wherein the unique identification further identifies information for a purchase of an audio content based on the radio station ID.

10. The method of claim 1, further comprising:
transmitting, by the server, an alert about the unique identification for the purchase of the non-audio item upon a condition associated with the mobile device being satisfied, wherein the condition is associated with at least one of:
a location of the mobile device;
a characteristic associated with the location of the mobile device;
a distance between the mobile device and a merchant associated with the non-audio item; or
a velocity or a speed of the mobile device.

11. A system comprising:
a microphone of a mobile device configured to receive ambient radio station audible audio;
a server configured to sample audible audio from a plurality of radio stations; and
a wireless transceiver of the mobile device configured to transmit the ambient radio station audible audio to the server;
wherein the server is further configured to:
identify a radio station identifier (ID) associated with the ambient radio station audible audio using a comparison of the ambient radio station audible audio to said audible audio from the plurality of radio stations;
determine, based on a timestamp of the ambient radio station audible audio and the radio station ID, a unique identification for a purchase of a non-audio item that corresponds to information embedded in the ambient radio station audible audio, wherein the unique identification for the purchase of the non-audio item is specific to a user of the mobile device; and
transmit the unique identification to the mobile device to enable the user to purchase the non-audio item using the mobile device.

12. The system of claim 11, wherein the server is further configured to sample the plurality of radio stations at predetermined intervals.

13. The system of claim 11, further comprising:
a GPS of the mobile device configured to identify current location data of the mobile device, wherein the wireless transceiver is further configured to transmit the current location data of the mobile device to the server, the server further configured to further base identification of the radio station ID on the current location data of the mobile device.

14. The system of claim 11, further comprising:
a mobile device processor further configured to:
detect any of:
measured audio over a predetermined minimum decibel level;
ambient audio that meets a predetermined level of certainty to be music;

a triggering audio signal with predetermined audio characteristics;

an indication from an accelerometer of the mobile device that a speed of the mobile device is over a predetermined minimum;

an indication from a GPS of the mobile device that rate of change of geographic location is over a predetermined minimum; or a combination thereof;

in response to said detection by the processor, automatically activate a station identification application; and record, by the station identification application, the ambient radio station audible audio.

15. The system of claim 14, wherein said detection includes at least two of:

measured audio over a predetermined minimum decibel level;

ambient audio that meets a predetermined level of certainty to be music;

a triggering audio signal with predetermined audio characteristics;

an indication from an accelerometer of the mobile device that a speed of the mobile device is over a predetermined minimum; or an indication from a GPS of the mobile device that rate of change of geographic location is over a predetermined minimum.

16. The system of claim 14, wherein a user interface of the station identification application is configured to receive a single user input in response to a prompt within the ambient radio station audible audio, and the wireless transceiver is further configured to transmit user data associated with the mobile device to the server, and wherein the server is further configured to transmit the user data associated with the mobile device and the single user input to a radio station server associated with the radio station ID.

17. A method of identifying radio stations playing in proximity to user mobile devices comprising:

sampling a plurality of radio station audible audio from a plurality of known radio stations, thereby generating sample audible audio segments;

tagging each sample audible audio segment with a broadcast region;

receiving, from a first user device, a GPS location and recorded audio of a contemporaneous radio station broadcast, the contemporaneous radio station broadcast from a first radio station;

identifying the first radio station based on a comparison of the recorded audio to sample audible audio segments from the plurality of known radio stations tagged with a broadcast region consistent with the GPS location; and determining, based on a timestamp of the ambient radio station audible audio and the first radio station, a unique identification for a purchase of a non-audio item that corresponds to information embedded in the recorded audio of the contemporaneous radio broadcast, wherein the unique identification for the purchase of the non-audio item is specific to a user of the first user device.

18. The method of claim 17, further comprising:

in response to said identifying, delivering user information associated with the first user device to the first radio station.

19. The method of claim 18, wherein said delivering further includes user input from the first user device prompted by content of the contemporaneous radio station broadcast.

20. The system of claim 11, wherein the server is configured to transmit, upon a condition associated with the mobile device being satisfied, an alert about the unique identification for the purchase of the non-audio item to the mobile device, wherein the condition is associated with at least one of:

a location of the mobile device;

a characteristic associated with the location of the mobile device;

a distance between the mobile device and a merchant associated with the non-audio item; or a velocity or a speed of the mobile device.

* * * * *